(12) United States Patent
Mashiki

(10) Patent No.: US 6,176,220 B1
(45) Date of Patent: Jan. 23, 2001

(54) COMBUSTION CONTROL DEVICE FOR INTERNAL COMBUSTION ENGINE

(75) Inventor: Zenichiro Mashiki, Toyota (JP)

(73) Assignee: Toyota Jidosha Kabushiki Kaisha, Toyota (JP)

(*) Notice: Under 35 U.S.C. 154(b), the term of this patent shall be extended for 0 days.

(21) Appl. No.: 09/319,546

(22) PCT Filed: Dec. 3, 1997

(86) PCT No.: PCT/JP97/04433

§ 371 Date: Aug. 12, 1999

§ 102(e) Date: Aug. 12, 1999

(87) PCT Pub. No.: WO98/26169

PCT Pub. Date: Jun. 18, 1998

(30) Foreign Application Priority Data

Dec. 13, 1996 (JP) .................................................. 8-333655
Dec. 19, 1996 (JP) .................................................. 8-339780

(51) Int. Cl.⁷ .............................. F02M 25/07; F02D 41/04
(52) U.S. Cl. ........................................... 123/436; 123/295
(58) Field of Search ....................................... 123/436, 295

(56) References Cited

U.S. PATENT DOCUMENTS

| | | | |
|---|---|---|---|
| 4,543,934 | * 10/1985 | Morita et al. | 123/436 |
| 4,724,813 | * 2/1988 | Cinpinski | 123/436 |
| 5,060,618 | * 10/1991 | Takaoka et al. | 123/436 |
| 5,226,390 | * 7/1993 | Nakagawa | 123/436 |
| 6,021,765 | * 2/2000 | Degroot et al. | 123/436 |

FOREIGN PATENT DOCUMENTS

| | | |
|---|---|---|
| 5-332176 | 12/1993 | (JP) . |
| 7-119513 | 5/1995 | (JP) . |
| 7-180598 | 7/1995 | (JP) . |
| 9-317535 | 12/1997 | (JP) . |

\* cited by examiner

Primary Examiner—Erick Solis
(74) Attorney, Agent, or Firm—Oliff & Berridge, PLC

(57) ABSTRACT

An engine 1 is provided with a fuel injection valve 11 for injecting fuel to be supplied to each of cylinders #1 to #4. An electrical control unit (ECU) 30 increases or decreases both a fuel injection amount and an exhaust gas recirculation (EGR) amount so as to quickly approximate torque variation of the engine 1 to a target value. By increasing or decreasing the fuel injection amount so that the target value of the torque variation is in an area of the EGR amount in which the torque variation does not excessively change with the change of the EGR amount, the torque variation is prevented from being largely displaced from the target value on the increase side.

10 Claims, 18 Drawing Sheets

COMBUSTION CONTROL DEVICE FOR INTERNAL COMBUSTION ENGINE

TECHNICAL FIELD

The present invention relates to a combustion control device for an internal combustion engine where part of the exhaust gas output is recirculated into an intake system of the internal combustion engine.

BACKGROUND ART

Conventionally, in general car engines, fuel is injected from a fuel injection valve into an intake port, so that a homogeneous mixture of the fuel and the air is supplied to a combustion chamber. In such engines, an intake path is opened or closed by a throttle valve which is activated in response to the operation of an accelerator. The opening or closing of the intake path serves to adjust the amount of intake air (resultantly, the amount of the homogeneous mixture of the fuel and the air) supplied to the combustion chamber of the engine, thus to control the engine power.

In such a so-called homogeneous burning technique, however, a large intake negative pressure is generated due to the throttling operation of the throttle valve, thereby increasing pumping loss and reducing the efficiency. A technique called "stratified burning" which overcomes the above problem is known, where the throttling of a throttle valve is reduced and fuel is directly supplied to a combustion chamber. This enables combustible mixed air to exist in the vicinity of an ignition plug, increasing the air fuel ratio in this region to improve the ignitability.

An engine employing the above technique is provided with a fuel injection valve for stratified burning which injects fuel directing to the region in the vicinity of the ignition plug. During a low load of the engine, fuel is injected from the fuel injection valve for stratified burning so that the fuel is locally supplied in the vicinity of the ignition plug. Simultaneously with this local supply of the fuel, a throttle valve is opened, to realize the "stratified burning" described above. This enables reducing fuel consumption as well as reducing pumping loss.

Such an engine is provided with an exhaust gas recirculation (EGR) mechanism to achieve emission reduction, as in a device described in Japanese Laid-Open Publication No. 7-119513, for example. Such an EGR mechanism includes an EGR path for associating an exhaust path and an intake path of the engine with each other and an EGR valve for opening or closing the EGR path. When the engine operates in a low load range, the opening/closing of the EGR valve is controlled so that as the load increases the amount of exhaust gas to be recirculated (the EGR amount) is reduced. This control enables reducing the air excess rate and thus improving the performance of cleaning of nitrogen oxide in a catalyst device.

The above publication also discloses a technique where torque variation (output variation) of an engine is approximated to a target value by controlling the EGR amount, so as to achieve both suppression of torque variation and reduction of emission. More specifically, when the torque variation exceeds a target value, the EGR amount is decreased to suppress the torque variation to below the target value. When the torque variation becomes less than the target value, the EGR amount is increased to approximate the torque variation to the target value, and thus to reduce the amount of nitrogen oxide emitted from the engine.

During the above "stratified burning", the relationship between the EGR amount and the torque variation is as shown in FIG. 22 when the fuel injection amount is fixed. More specifically, in an area of a smaller EGR amount, the change in torque variation with increase or decrease of the EGR amount is small. In an area of a larger EGR amount, the change in torque variation with increase or decrease of the EGR amount is large. The reason why the change in torque variation with increase or decrease of the EGR amount is small in the area of a smaller EGR amount is that, since a mixed gas with a high-concentration fuel exists in the vicinity of an ignition plug in the "stratified burning", the combustion state of such a mixed gas is not easily changed with a change in the EGR amount.

In the above relationship between the EGR amount and the torque variation, assume that the EGR amount is at point A in FIG. 22. In this case, the torque variation is considerably smaller than the target value. In order to approximate the torque variation to the target value, the control is made to increase the EGR amount. This results in the torque variation shifting as shown by the solid line in FIG. 22 from point A toward the target value, i.e., point B.

In the above case, however, the torque variation increase only at a small change rate as the EGR amount is increased in the area of a smaller EGR amount as described above. It is therefore impossible to quickly approximate the torque variation to the target value.

On the contrary, in the area of a larger EGR amount, the torque variation excessively shifts as the EGR amount changes. This makes it difficult to correctly control the torque variation to be approximated to the target value. To describe more precisely, due to a response delay of the change in the EGR amount, the EGR amount does not immediately change in response to a change in the opening of the EGR valve. Accordingly, when the torque variation exceeds the target value (arrow C in FIG. 22), the torque variation exhibits a sharp increase from the target value due to the response delay at the start of decrease of the EGR amount. Such an excessive torque variation may cause a reduction of drivability.

In recent years, in order to reduce fuel consumption, the air fuel ratio of a homogeneous mixed gas to be supplied to a combustion chamber is made larger than a theoretical air fuel ratio, and swirl is generated in the mixed gas, so as to perform "lean burning".

During the "lean burning", as the EGR amount increases, the ignitability of the mixed gas decreases and simultaneously the flame speed in the mixed gas decreases. Accordingly, if the EGR amount excessively increases, the mixed gas may not be ignited or may fail to be burned out if ignited, resulting in increasing the torque variation of the engine.

During the "lean burning", also, the amount of fuel included in the mixed gas per unit volume decreases. As a result, the torque variation of the engine increases or decreases in response to a change in the fuel injection amount from a fuel injection valve. For example, the torque variation of the engine increases when the fuel injection amount falls below a required amount due to a design size tolerance for the fuel injection valve and the like. On the contrary, the torque variation of the engine decreases when the fuel injection amount exceeds the required amount due to a design size tolerance for the fuel injection valve and the like.

According to the above conventional technique, when the torque variation increases due to a decrease of the fuel injection amount below the required amount due to a design size tolerance and the like, it is attempted to suppress the torque variation by decreasing the EGR amount to be approximated to the target value. However, since the above increase of the torque variation is caused by the decrease of the fuel injection amount due to a design size tolerance for the fuel injection valve and the like, such torque variation is not suppressed even if the EGR amount is decreased. Surging generated in the engine due to the torque variation is not suppressed, either. Moreover, since the emission amount of nitrogen oxide ($NO_x$) increases due to the decrease of the EGR amount, emission is worsened.

DISCLOSURE OF THE INVENTION

In order to solve the above conventional problems, an object of the present invention is to provide a combustion control device for an internal combustion engine, which can achieve quick approximation of output variation of the interval combustion engine to a target value while suppressing emission worsening.

As shown in FIG. 1, the combustion control device for an internal combustion engine according to the present invention includes: fuel injection means M2 for injecting fuel into a cylinder of an internal combustion engine M1; exhaust gas recirculation means M3 for recirculating part of exhaust gas exhausted from an exhaust system of the internal combustion engine M1 to an intake system of the internal combustion engine M1; output variation detection means M4 for detecting output variation of the internal combustion engine M1; and control means M5 for controlling both the fuel injection amount injected by the fuel injection means M2 and the exhaust gas amount to be recirculated by the exhaust gas recirculation means M3, based on the output variation detected by the output variation detection means M4 so as to approximate the output variation to a target value.

With the above configuration, fuel injected from the fuel injection means M2 is supplied to a cylinder of the internal combustion engine M1, so that combustion is performed with a mixed gas composed of the fuel and the air. When the output variation of the internal combustion engine M1 is displaced from a target value, the control means M5 increases or decreases both the fuel injection amount injected by the fuel injection means M2 and the exhaust gas amount to be recirculated to the intake system of the internal combustion engine M1, so as to approximate the output variation to the target value. In other words, the output variation of the internal combustion engine M1 is approximated to the target value by increasing or decreasing both the fuel injection amount and the exhaust gas amount to be recirculated. Thus, the output variation can be quickly approximated to the target value.

In one embodiment, the control means M5 decreases the fuel injection amount and increases the exhaust gas amount to be recirculated when the output variation of the internal combustion engine M1 is smaller than the target value. Also, the control means M5 increases the fuel injection amount and decreases the exhaust gas amount to be recirculated when the output variation of the internal combustion engine M1 is larger than the target value.

In general, the air fuel ratio of a mixed gas during stratified burning is larger than a theoretical air fuel ratio. Accordingly, when the output variation of the internal combustion engine M1 is smaller than a target value, the output variation can be made larger by decreasing the fuel injection amount. At this time, the output variation also becomes large by increasing the exhaust gas amount to be recirculated because the ignitability and the flame speed of the mixed gas decrease. This means that when the output variation becomes smaller than a target value, the output variation can be reliably approximated to the target value by both decreasing the fuel injection amount and increasing the exhausted gas recirculation amount. Likewise, when the output variation of the internal combustion engine M1 is larger than a target value, the output variation can be made small by increasing the fuel injection amount. At this time, the output variation also becomes small by decreasing the exhaust gas amount to be recirculated. This means that when the output variation becomes larger than a target value, the output variation can be reliably approximated to the target value by both increasing the fuel injection amount and decreasing the exhausted gas recirculation amount.

In one embodiment, the control means M5 decreases the fuel injection amount when the output variation of the internal combustion engine M1 is less than the target value, and increases the exhaust gas amount to be recirculated when the output variation of the internal combustion engine falls further. Also, the control means M5 increases the fuel injection amount when the output variation of the internal combustion engine M1 is greater than the target value, and decreases the exhaust gas amount to be recirculated when the output variation of the internal combustion engine increases further.

More specifically, when the torque variation of the internal combustion engine M1 is slightly changed from the target value on the increase side or on the decrease side, only the fuel injection amount is increased or decreased before the exhaust gas recirculation amount is increased or decreased, to approximate the torque variation to the target value. In this case, since the exhaust gas recirculation amount is not increased or decreased, emission is prevented from worsening. Also, since the fuel injection amount can be decreased without increasing the exhaust gas recirculation amount, the fuel consumption of the internal combustion engine M1 is reduced.

In one embodiment, the internal combustion engine M1 performs homogeneous burning and stratified burning selectively, and a maximum fuel correction amount used when the fuel injection amount is corrected incrementally to approximate the output variation of the internal combustion engine M1 to a target value during the stratified burning is set at a value smaller than a maximum fuel correction amount used when the fuel injection amount is corrected incrementally to approximate the output variation to the target value during the homogeneous burning.

Thus, by setting the maximum fuel correction amount used during the stratified burning at a value smaller than the maximum fuel correction amount used for the homogeneous burning, misfiring can be prevented even during the stratified burning in which a mixed gas including fuel at a high concentration exists in the vicinity of the ignition plug.

As shown in FIG. 2, the combustion control device for an internal combustion engine according to the present invention includes: fuel injection means M12 for injecting fuel into a cylinder of the internal combustion engine M11; exhaust gas recirculation means M13 for recirculating part of exhaust gas exhausted from an exhaust system of the internal combustion system M11, to an intake system of the internal combustion system M11; output variation detection means M14 for detecting output variation of the internal combustion engine M11; injection amount control means M15 for controlling a fuel injection amount injected by the fuel injection means M12 based on the output variation detected by the output variation detection means M14 so as to approximate the output variation to a target value; and recirculation amount control means M16 for controlling an exhaust gas amount to be recirculated by the exhaust gas recirculation means M1 based on the fuel injection amount controlled by the injection amount control means M15 so as to approximate the output variation to the target value.

With the above configuration, the fuel injection amount injected by the fuel injection means M12 is increased or decreased to approximate the output variation of the internal combustion engine M11 by the injection amount control means M15. Also, the exhaust amount to be recirculated to approximate the output variation of the internal combustion engine M11 to the target value is controlled by the exhaust gas recirculation means M13 based on the fuel injection amount increased or decreased by the injection amount control means M15. This prevents emission worsening which may occur by an insufficient exhaust gas amount being recirculated.

In one embodiment, the injection amount control means M15 decreases the fuel injection amount when the output variation of the internal combustion engine M11 is smaller than the target value. Also, the injection amount control means M15 increases the fuel injection amount when the output variation of the internal combustion engine M11 is larger than the target value. In this way, the output variation is approximated to the target value.

In one embodiment, the recirculation amount control means M16 decreases the exhaust gas to be recirculated when the fuel injection amount controlled by the injection amount control means M15 is displaced from a predetermined range of increase and decrease on the increase side. Also, the recirculation amount control means M16 makes larger a decrease of the exhaust gas amount to be recirculated as the fuel injection amount controlled by the injection amount control means M15 is displaced farther from the predetermined range of increase and decrease.

The fuel injection amount controlled by the injection amount control means M15 is increased or decreased with respect to a required amount due to the size tolerances of the intake system and the fuel system of the internal combustion engine M11. When the fuel injection amount is displaced on the increase side from the range of increase and decrease in which the fuel injection amount is increased or decreased due to the size tolerances and the like, the exhaust gas amount to be recirculated to the intake system of the internal combustion engine M11 is decreased by the recirculation amount control means M16. By this control, when the fuel injection amount becomes smaller than the required amount due to the tolerances described above, increasing the output variation of the internal combustion engine M11, the exhaust gas amount to be recirculated will not be decreased to approximate the output variation to a target value. Also, as the fuel injection amount controlled by the injection amount control means M15 is displaced farther from the above range of increase and decrease, the reduction of the exhaust gas recirculation amount is made larger. Accordingly, the output variation of the internal combustion engine M11 can be reliably suppressed even when the fuel injection amount is widely displaced on the increase side from the range of increase and decrease of the fuel injection amount due to a size tolerance and the like described above.

As a result, in the internal combustion engine M11 performing lean burning, emission can be reliably prevented from worsening, which otherwise occurs because the exhaust gas to be recirculated is decreased when the fuel injection amount decreases below the required amount due to the size tolerances of the intake system and the fuel system of the internal combustion engine M11.

In one embodiment, the recirculation amount control means M16 increases the exhaust gas to be recirculated when the fuel injection amount controlled by the injection amount control means is displaced from a predetermined range of increase and decrease on the decrease side. Also, the recirculation amount control means M16 makes larger the increase of the exhaust gas amount to be recirculated as the fuel injection amount controlled by the injection amount control means M15 is displaced farther from the predetermined range of increase and decrease.

In other words, when the fuel injection amount controlled by the injection control means M15 is displaced on the increase side from the range of increase and decrease of the fuel injection amount due to the size tolerances and the like described above, the increase of the exhaust gas amount to be recirculated is made larger as the displacement of the fuel injection amount from the range of increase and decrease is larger.

Accordingly, in the internal combustion engine M11 performing lean burning, emission can be reliably suppressed from worsening even when the fuel injection amount increased or decreased by the injection amount control means M15 is widely displaced on the decrease side from the range of increase and decrease of the fuel injection amount due to the size tolerances and the like described above.

BEST MODES FOR CARRYING OUT THE INVENTION

Hereinbelow, the combustion control device for an internal combustion engine according to the present invention will be described with reference to the relevant drawings, in the form of embodiments as applied to a car engine.

(First embodiment)

Figure 1:
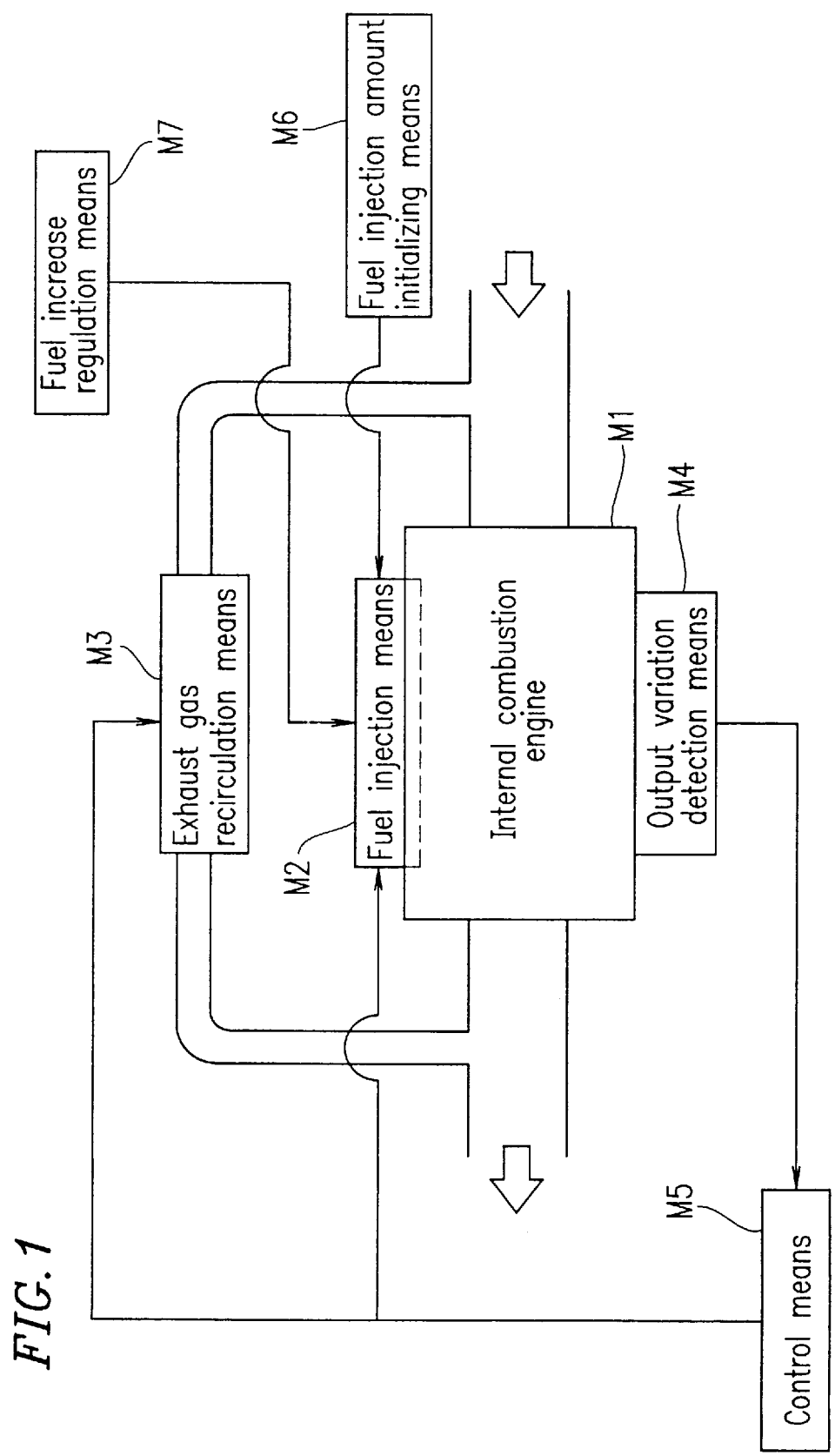
FIG. 1 is a block diagram illustrating a basic concept of the present invention.
Figure 2:
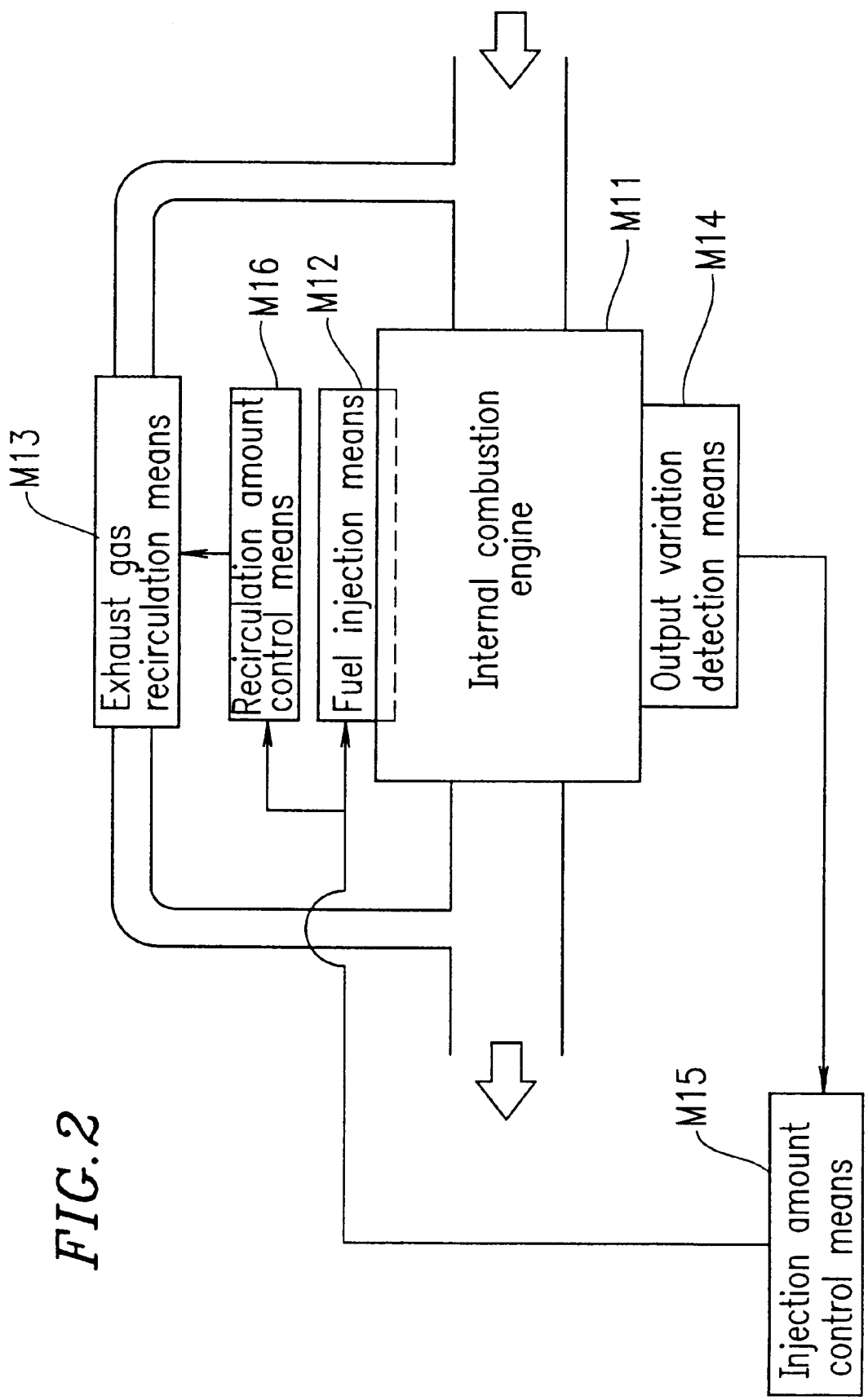
FIG. 2 is another block diagram illustrating a basic concept of the present invention.
Figure 3:
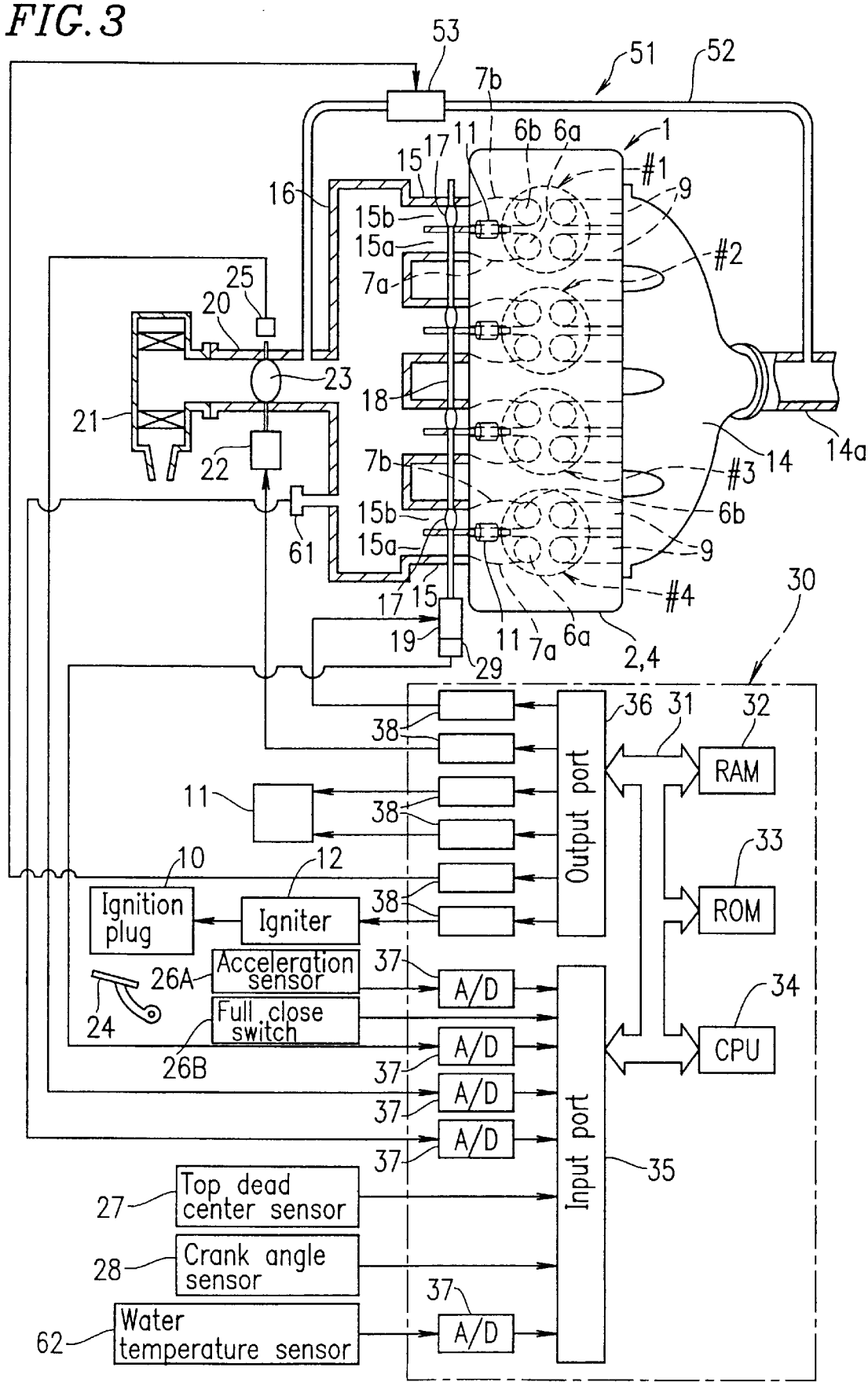
FIG. 3 is a schematic construction view illustrating a combustion control device for an engine of the first embodiment according to the present inventio.
Figure 4:
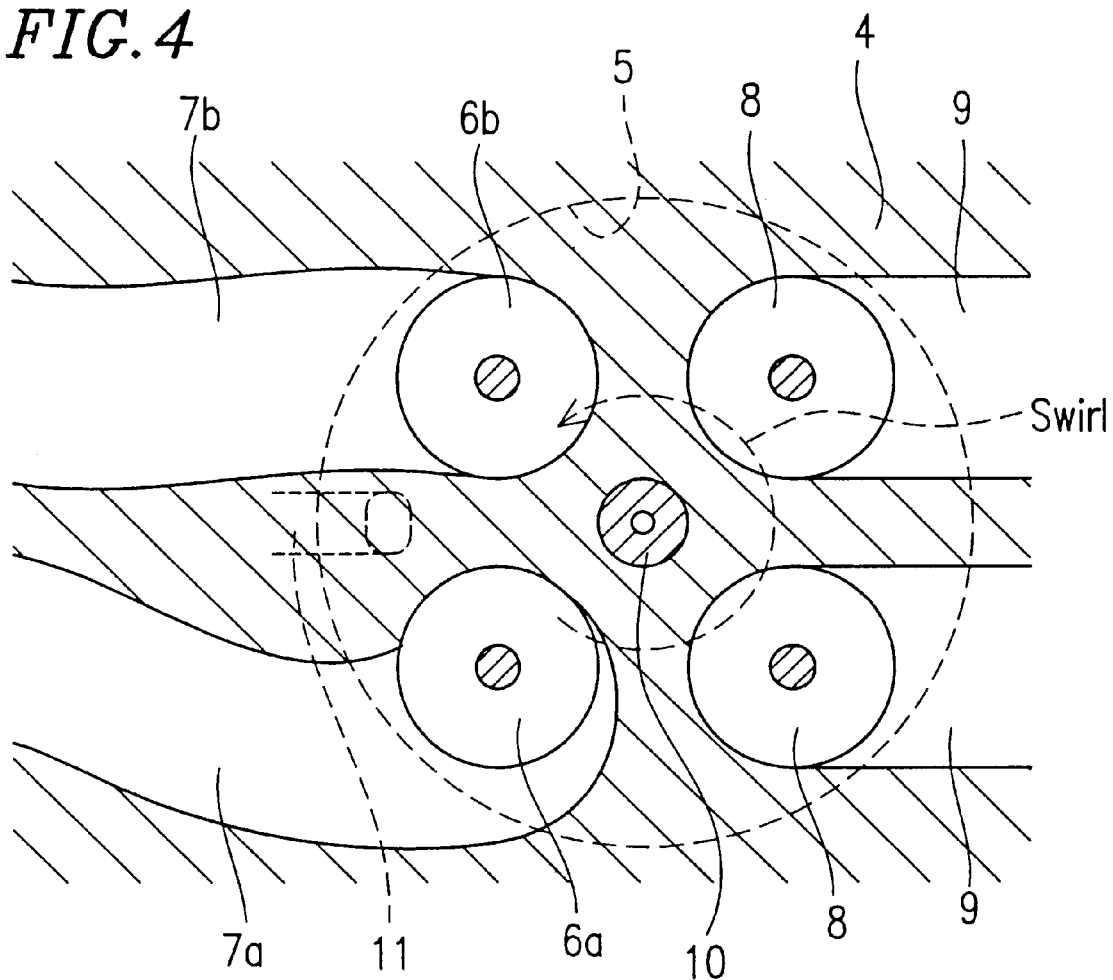
FIG. 4 is an enlarged sectional view of a cylinder portion of the engine of FIG. 3.

FIG. 3 is a schematic construction view illustrating a combustion control device for a cylinder injection type engine mounted in a car. An internal combustion engine 1 includes four cylinders #1 to #4, for example. FIG. 4 shows a structure of a combustion chamber of one of the cylinders #1 to #4. As shown in FIGS. 3 and 4, the engine 1 includes pistons which reciprocate in a cylinder block 2. A cylinder head 4 is disposed above the cylinder block 2. A combustion chamber 5 is defined between each piston and the cylinder head 4. In the illustrated device, each of the cylinders #1 to #4 is provided with four valves. In FIG. 4, first and second intake valves 6a and 6b, together with first and second intake ports 7a and 7b, and a pair of exhaust valves 8, together with a pair of exhaust ports 9, are shown.

As shown in FIG. 4, the first intake port 7a is a helical intake port, while the second intake port 7b is a straight port extending substantially straight. In the center of the inner wall of the cylinder head 4 is disposed an ignition plug 10.

The ignition plug 10 is supplied with a high voltage from an ignitor 12 via a distributor (not shown). The timing of the ignition of the ignition plug 10 is determined by the timing of the output of a high voltage from the igniter 12. A fuel injection valve 11 is disposed at a position of the periphery of the inner wall of the cylinder head 4 near the first and second intake valves 6a and 6b. In other words, in the illustrated device, fuel from the fuel injection valve 11 is directly injected into each of the cylinders #1 to #4.

Referring to FIG. 3, the first and second intake ports 7a and 7b of each of the cylinders #1 to #4 are associated with a surge tank 16 via respective first and second intake paths 15a and 15b formed in each intake manifold 15. Each second intake path 15b is provided with a swirl control valve 17. The swirl control valves 17 are coupled with a step motor 19, for example, via a common shaft 18. The step motor 19 is controlled based on an output signal from an electrical control unit (ECU) 30 which will be described hereinafter.

The step motor 19 may be replaced with an element which is controlled in accordance with the negative pressure of the intake ports 7a and 7b of the engine 1.

The surge tank 16 is coupled with an air cleaner 21 via an intake duct 20. The intake duct 20 includes a throttle valve 23 which is opened or closed by a step motor 22. In other words, the throttle valve 23 is of an electronic control type, where, basically, the step motor 22 is driven based on an output signal from the ECU 30 described above, so as to control the opening/closing of the throttle valve 23. Depending on the opening/closing of the throttle valve 23, the amount of intake air introduced into each combustion chamber 5 via the intake duct 20 is adjusted.

A throttle sensor 25 for detecting the opening of the throttle valve 23 (throttle opening) is disposed in the vicinity of the throttle valve 23. The exhaust ports 9 of the cylinders #1 to #4 are associated with an exhaust manifold 14. Exhaust gas after combustion is exhausted to an exhaust duct 14a via the exhaust manifold 14.

The illustrated combustion control device is further provided with a known exhaust gas recirculation (EGR) mechanism 51. The EGR mechanism 51 includes an exhaust gas recirculation (EGR) path 52 and an EGR valve 53 disposed midway of the EGR path 52. The EGR path 52 is disposed so as to associate a portion of the intake duct 20 downstream of the throttle valve 23 with the exhaust duct 14a. The EGR valve 53 includes a valve seat, a valve body, and a step motor although they are not shown. The opening of the EGR valve 53 is adjusted by intermittently displacing the valve head with respect to the valve seat by the step motor. When the EGR valve 53 opens, part of the exhaust gas exhausted to the exhaust duct 14a flows through the EGR path 52, to reach the intake duct 20 via the EGR valve 53. In other words, part of the exhaust gas is recirculated into an intake mixed gas by means of the EGR mechanism 51. The recirculation amount of the exhaust gas (EGR amount) is adjusted by adjusting the opening of the EGR valve 53.

The ECU 30 is a digital computer, including a random access memory (RAM) 32, a read only memory (ROM) 33, a central processing unit (CPU) 34 composed of a microprocessor, an input port 35, and an output port 36 which are mutually connected via a bus 31.

An accelerator 24 for operating the throttle valve 23 is connected with an acceleration sensor 26A which generates an output voltage in proportion to the amount of pressing of the accelerator 24, so that the opening of the accelerator is detected by the acceleration sensor 26A. The output voltage of the acceleration sensor 26A is sent to the input port 35 via an A/D convertor 37. The accelerator 24 is provided with a full close switch 26B which detects that the amount of pressing of the accelerator 24 is zero. More specifically, the full close switch 26B generates a signal "1" as a full close signal when the amount of pressing of the accelerator 24 is zero and otherwise generates a signal "0". The output voltage of the full close switch 26B is also sent to the input port 35.

A top dead center sensor 27 generates an output pulse when the cylinder #1, for example, reaches the intake top dead center, and the output pulse is sent to the input port 35. A crank angle sensor 28 generates an output pulse whenever a crank shaft rotates by 30° CA, for example, and the output pulse is sent to the input port 35. The CPU 34 calculates (reads) the crank position and the number of revolutions of the engine (NE) from the output pulses of the top dead center sensor 27 and the crank angle sensor 28.

The rotational angle of the shaft 18 is detected by a swirl control valve sensor 29, to enable the measurement of the opening of the swirl control valves 17. The output of the swirl control valve sensor 29 is sent to the input port 35 via the A/D converter 37.

The throttle sensor 25 detects the throttle opening, and the output of the throttle sensor 25 is sent to the input port 35 via the A/D converter 37.

The illustrated combustion control device also includes an intake pressure sensor 61 for detecting the pressure (intake pressure) in the surge tank 16, and a water temperature sensor 62 for detecting the temperature of cooling water for the engine 1. The outputs of these sensors 61 and 62 are also sent to the input port 35 via the A/D converter 37.

The output port 36 is connected to the fuel injection valve 11, the step motors 19 and 22, the igniter 12, and the EGR valve 53 (the step motor) via corresponding driving circuits 38. The ECU 30 controls the operations of the fuel injection valves 11, the step motors 19 and 22, the igniter 12 (the ignition plug 10), the EGR valve 53, and the like in accordance with a control program stored in the ROM 33.

Figure 5:
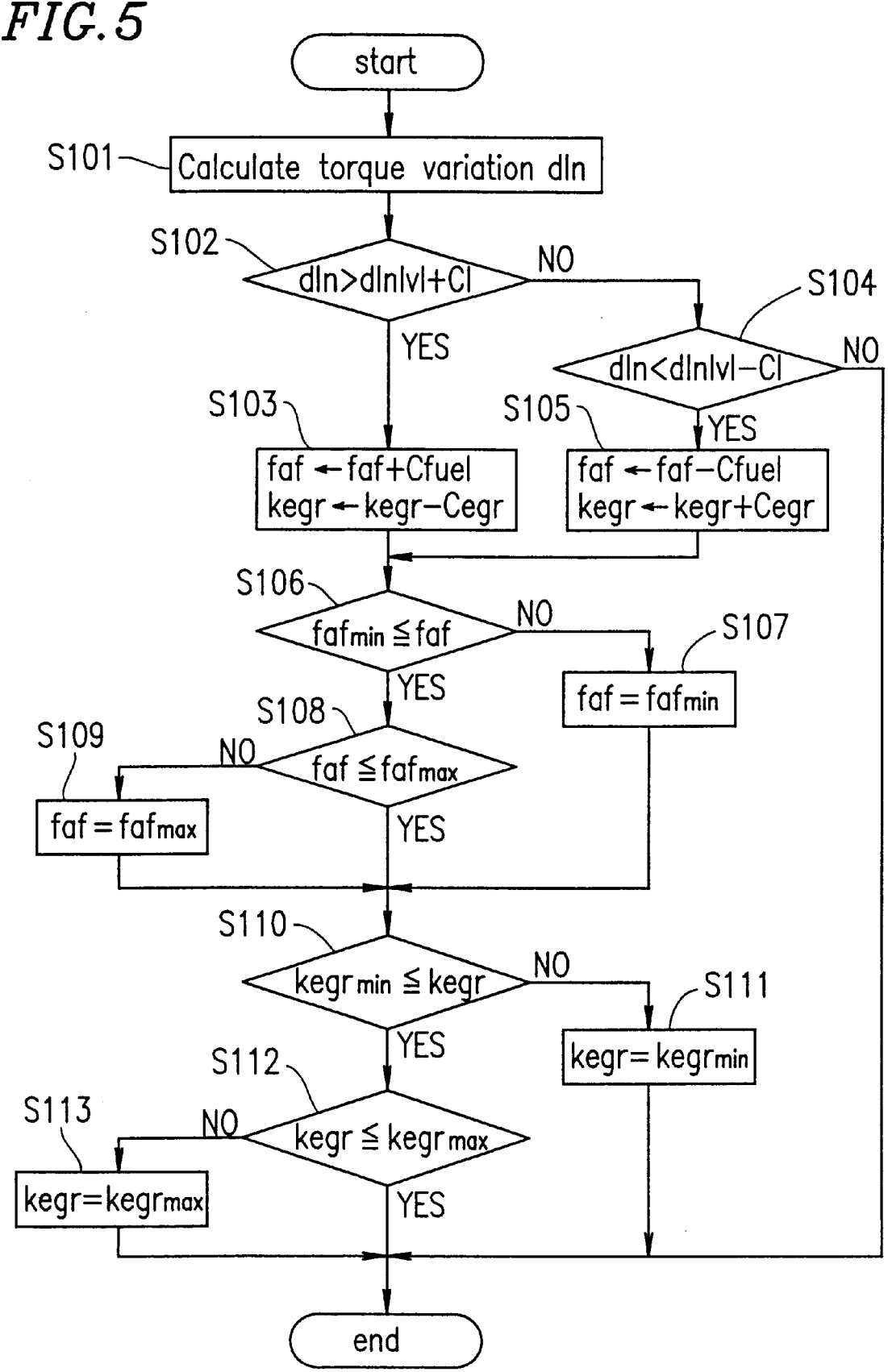
FIG. 5 is a flowchart showing a processing routine for controlllling the fuel injection amount and the EGR amount in the first embodiment.

Referring to FIG. 5, the fuel injection amount control and the EGR amount control by the combustion control device of the first embodiment will be described. FIG. 5 shows a processing routine for the fuel injection amount control and the EGR amount control, which is executed by the ECU 30 during "stratified burning". This processing routine is executed at an occasion of angle interruption for each predetermined crank angle.

In the illustrated processing routine, at step S101, the ECU 30 calculates a torque variation dln of the entire engine 1 based on the output pulses from the top dead center sensor 27 and the crank angle sensor 28. The torque variation dln is an average value of torque variations dln1 to dln4 generated in the cylinders #1 to #4, which is calculated by expression (1) below.

$$dln = (dln1 + dln2 + dln3 + dln4)/4 \quad (1)$$

Figure 6:
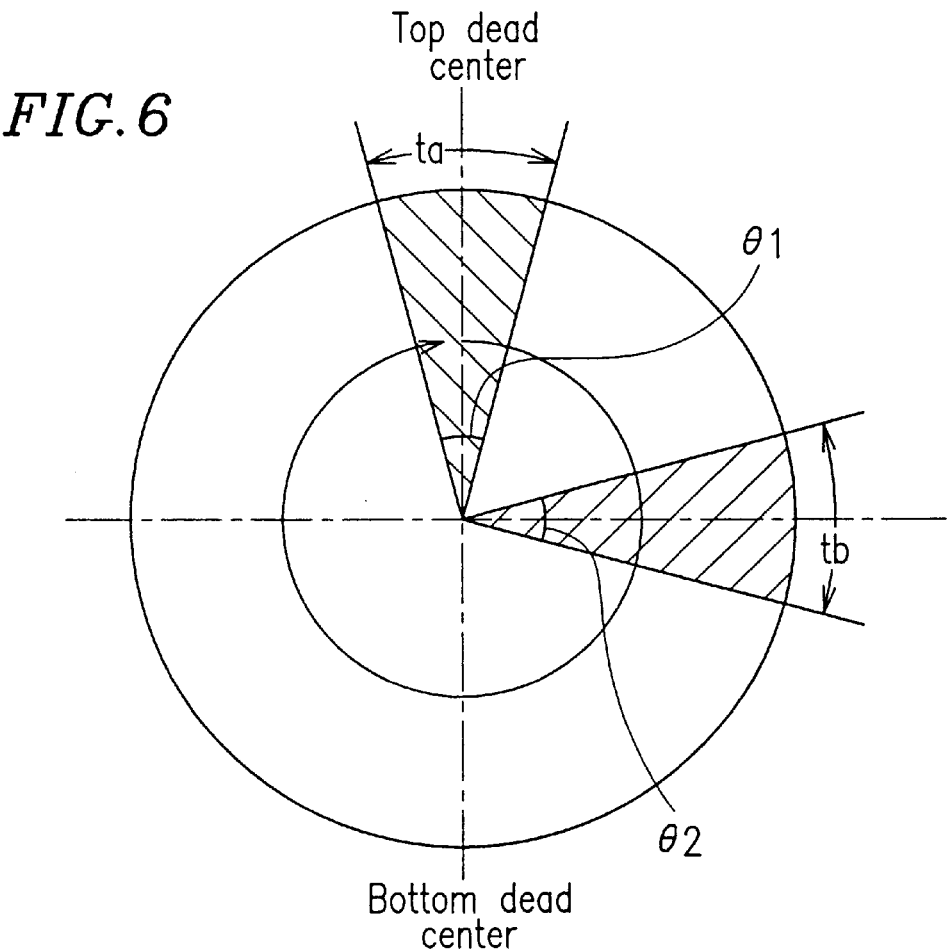
FIG. 6 is a view explaining the method of calculating the torque variation.

A torque T generated on each combustion in the cylinders #1 to #4 has the relationship represented by expression (2) below.

$$T \propto (30°/t_b)^2 - (30°/t_a)^2 \quad (2)$$

wherein $t_a$ denotes the time required for the crank shaft of the engine 1 to pass a predetermined crank angle portion θ1 including the top dead center (see FIG. 6), and $t_b$ denotes the time required for the crank shaft to pass a predetermined crank angle portion θ2 rotated by 90° from the A torque T generated on each combustion in the cylinders #1 to #4 has the relationship represented by expression (2) below.

top dead center (see FIG. 6). The crank angle portions θ1 and θ2 are the same. For example, they are 30°.

The torque variation dln1 generated in the cylinder #1, for example, is calculated based on the difference in the torque T generated on each combustion in the cylinder #1, as represented by expression (3) below.

$$dln1 = \{(30°/t_{b1})^2 - (30°/t_{a1})^2\} - \{(30°/t_{1-1})^2 - (30°/t_{a1-1})^2\} \quad (3)$$

The torque variations dln2 to dln4 generated in the cylinders #1 to #4 are also calculated as described for the torque variation dln1. The torque variation dln of the entire engine 1 is calculated based on the torque variations dln1 to dln4 generated in the cylinders #1 to #4 according to expression (1) above.

Figure 8:
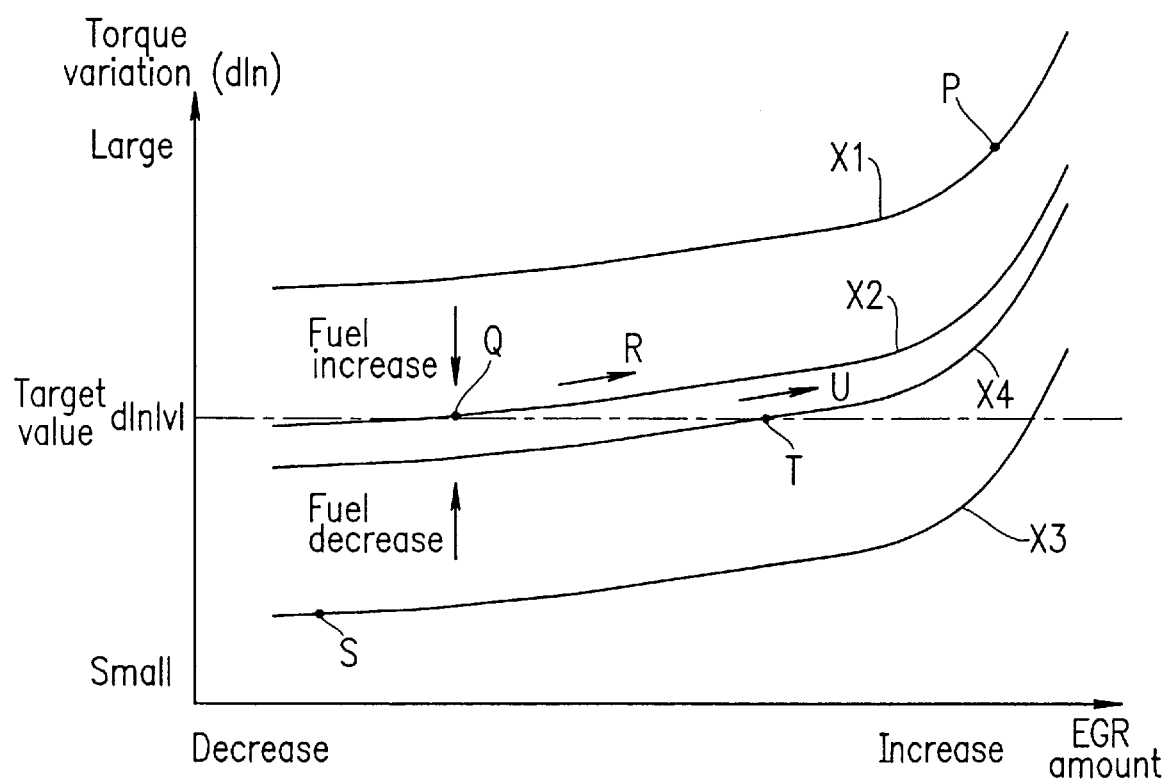
FIG. 8 is a graph showing a relationship among the torque variation, the fuel injection amount, and the EGR amount in the first embodiment.
Figure 9:
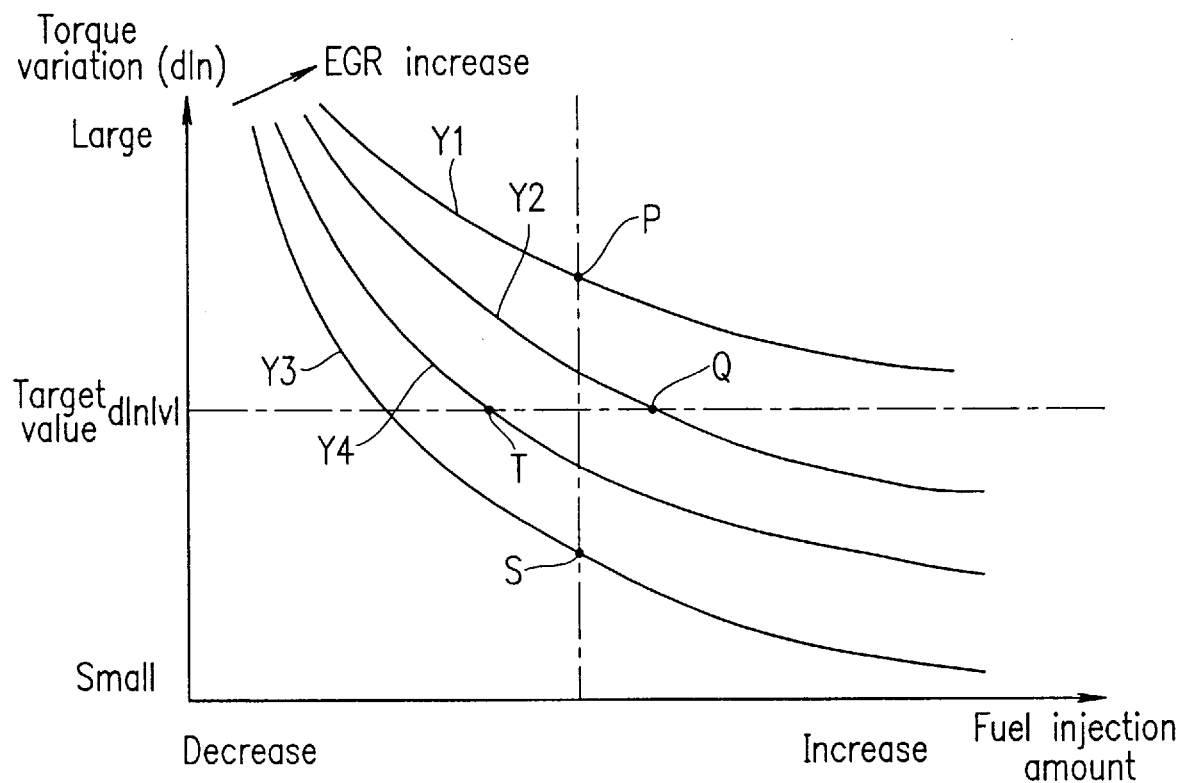
FIG. 9 is a graph showing another relationship among the torque variation, the fuel injection amount, and the EGR amount in the first embodiment.

At step S102, the ECU 30 determines whether or not the calculated torque variation dln is larger than a value obtained by adding a predetermined value C1 to a target value dln|v| (dln|v|+C1). If dln>dln|v|+C1, i.e., the torque variation dln is in a range A, the torque variation dln and the EGR amount have the relationship represented by the solid line X1 in FIG. 8, the torque variation dln and the fuel injection amount have the relationship represented by the solid line Y1 in FIG. 9, and the NO$_x$ emission amount and the fuel injection amount have the relationship represented by the solid line Z1 in FIG. 10.

At step S103, the ECU 30 sets a value obtained by adding a predetermined value Cfuel to a fuel correction amount faf used in the preceding correction of the combustion injection amount (faf+Cfuel) as a new fuel correction amount faf. The ECU 30 also sets a value obtained by subtracting a predetermined value Cegr from an EGR correction amount kegr used in the preceding correction of the EGR amount (kegr−Cegr) as a new EGR correction amount kegr. In short, at step S103, the fuel injection amount is incrementally corrected, while the EGR amount is decrementally corrected.

Figure 10:
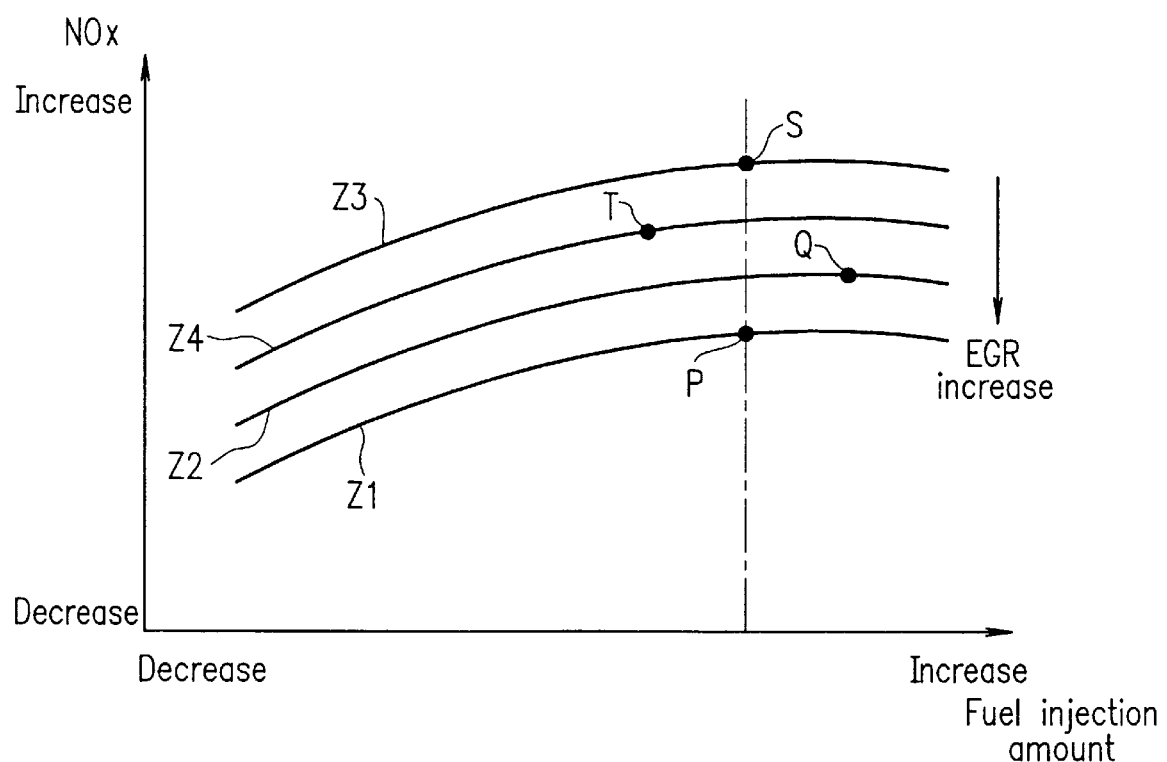
FIG. 10 is a graph showing the relationship among the $NO_x$ amount, the fuel injection amount, and the EGR amount in the first embodiment.

Assume that the EGR amount and the fuel injection amount are at points on the solid lines X1 (FIG. 8), Y1 (FIG. 9), and Z1 (FIG. 10). In this case, when the fuel injection amount is increased as described above, the torque variation dln decreases. This is because the air fuel ratio of a mixed gas during the stratified burning is larger than a theoretical air fuel ratio. When the EGR amount is decreased as described above, the torque variation dln also decreases. This is because the ignitability and the flame speed of the mixed gas improve. As a result, the relationship between the torque variation dln and the EGR amount shifts to that represented by the solid line X2 in FIG. 8, and point P on the solid line X1 shifts toward point Q on the solid line X2. The relationship between the torque variation and the fuel injection amount shifts to that represented by the solid line Y2 in FIG. 9, and point P on the solid line Y1 shifts toward point Q on the solid line Y2. The relationship between the NO$_x$ emission amount and the fuel injection amount shifts to that represented by the solid line Z2 in FIG. 10, and point P on the solid line Z1 shifts toward point Q on the solid line Z2.

Thus, by both increasing the fuel injection amount and decreasing the EGR amount, the shift from point P to point Q is realized, allowing for quick reduction of the torque variation dln. In this way, the torque variation dln can be quickly and reliably approximated to the target value dln|v|. Due to the shift from point P to point Q, also, the target value dln|v| is located at point Q which is within an area where the torque variation does not excessively change with the change of the EGR amount. Accordingly, the increase of the torque variation dln is slow when the torque variation dln starts increasing from the target value dln|v| at point Q (arrow R in FIG. 8), ensuring that the torque variation dln will not be greatly displaced on the increase side with respect to the target value dln|v|. In addition, since the change in the NO$_x$ emission amount with the change in the EGR amount is small in "stratified burning", the NO$_x$ amount is prevented from increasing excessively with the shift from point P to point Q.

Figure 7:
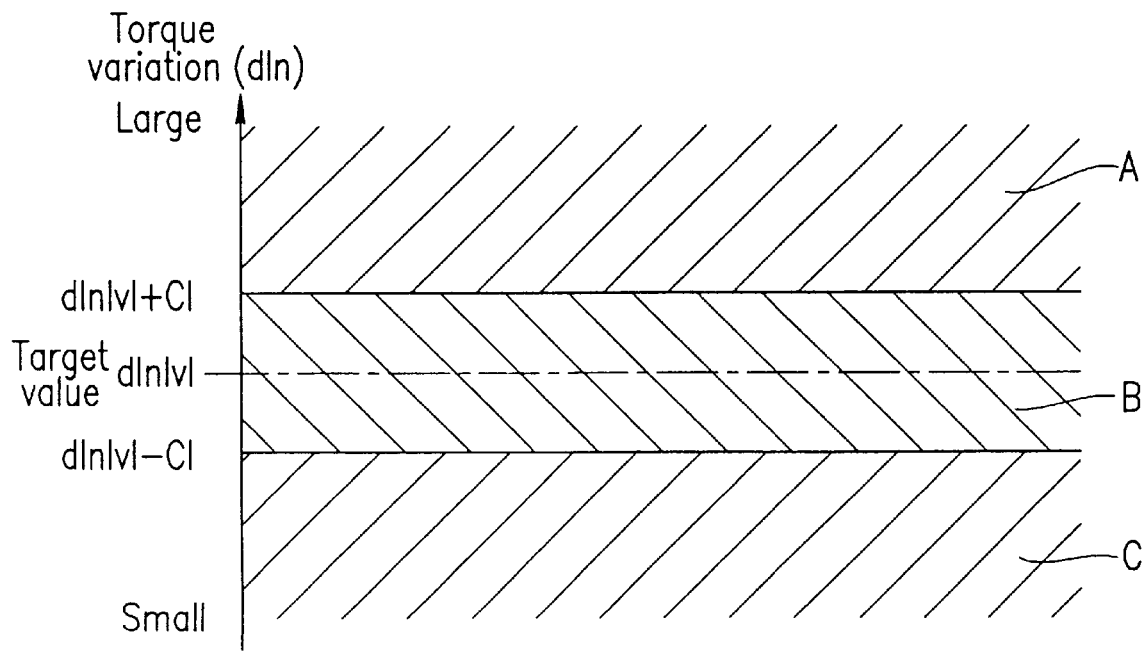
FIG. 7 is a graph showing ranges of the torque variation.

If it is determined that "dln>dln|v|+C1" is not established at step S102, the process proceeds to step S104. At step S104, the ECU 30 determines whether or not the torque variation dln is smaller than a value obtained by substracting the predetermined value C1 from the target value dln|v| (dln|v|=C1). If "dln<dln|v|−C1" is not established, i.e., the torque variation dln is in a range B shown in FIG. 7, the ECU 30 terminates this processing routine. If dln<dln|v|−C1, i.e., the torque variation dln is in a range C, the process proceeds to step S105. When the torque variation dln is in the range C, the torque variation dln and the EGR amount have the relationship represented by the solid line K3 in FIG. 8, the torque variation dln and the fuel injection amount have the relationship represented by the solid line Y3 in FIG. 9, and the $NO_x$ emission amount and the fuel injection amount have the relationship represented by the solid line Z3 FIG. 10.

At step S105, the ECU 30 sets a value obtained by subtracting the predetermined value Cfuel from the fuel correction amount faf used in the preceding correction of the combustion injection amount (faf−Cfuel) as a new fuel correction amount faf. The ECU 30 also sets a value obtained by adding the predetermined value Cegr to the EGR correction amount kegr used in the preceding EGR correction (kegr+Cegr) as a new EGR correction amount kegr. In short, at step S105, the fuel injection amount is decrementally corrected, while the EGR amount is incrementally corrected.

Assume that the EGR amount and the fuel injection amount are at points S on the solid lines X3 (FIG. 8), Y3 (FIG. 9), and Z3 (FIG. 10). In this case, when the fuel injection amount is decreased as described above, the torque variation dln increases. This is because the air fuel ratio of a mixed gas during the stratified burning is larger than a theoretical air fuel ratio. When the EGR amount is increased as described above, the torque variation dln also increases. This is because the ignitability and the flame speed of the mixed gas become low. As a result, the relationship between the torque variation dln and the EGR amount shifts to that represented by the solid line X4 in FIG. 8, and point S on the solid line X3 shifts toward point T on the solid line X4. The relationship between the torque variation and the fuel injection amount shifts to that represented by the solid line Y4 in FIG. 9, and point S on the solid line Y3 shifts toward point T on the solid line Y4. The relationship between the $NO_x$ emission amount and the fuel injection amount shifts to that represented by the solid line Z4 in FIG. 10, and point S on the solid line Z3 shifts toward point T on the solid line Z4.

Thus, by both decreasing the fuel injection amount and increasing the EGR amount, the shift from point S to point T is realized, allowing for quick increase of the torque variation dln. In this way, the torque variation dln can be quickly and reliably approximated to the target value dln|v|. Due to the shift from point S to point T, also, the target value dln|v| is located at point T which is within an area where the torque variation does not excessively change with the change of the EGR amount. Accordingly, the increase of the torque variation dln is slow when the torque variation dln starts increasing from the target value dln|v| at point T (arrow U in FIG. 8), ensuring that the torque variation dln will not be greatly displaced on the increase side with respect to the target value dln|v|. In addition, since the EGR amount is increased with the shift from point S to point T, the $NO_x$ emission amount can be reduced.

After the processing at step S103 or step S105, the ECU 30 proceeds to step S106. At step S106, the ECU 30 determines whether or not the fuel correction amount faf is equal to or greater than the allowable minimum value $faf_{min}$ ($faf_{min} \leq faf$). If "$faf_{min} \leq faf$" is not established, the process proceeds to step S107, where the fuel correction amount faf is restricted by the minimum value (minimum fuel correction amount) $faf_{min}$, and then proceeds to step S110. If $faf_{min} \leq faf$ at step S106, the process proceeds to step S108, where the ECU 30 determines whether or not the fuel correction amount faf is equal to or less than the allowable maximum value $faf_{max}$ ($faf \leq faf_{max}$). If "$faf \leq faf_{max}$" is not established, the process proceeds to step S109, where the fuel correction amount faf is restricted by the maximum value (maximum fuel correction amount) $faf_{max}$, and then proceeds to step S110. If $faf \leq faf_{max}$ at step S108, the process directly proceeds to step S110, determining that the fuel correction amount faf is within the allowable range.

At step S110, the ECU 30 determines whether or not the EGR correction amount kegr is equal to or greater than the allowable minimum value $kegr_{min}$ ($kegr_{min} \leq kegr$). If "$kegr_{min} \leq keger$" is not established, the process proceeds to step S111, where the EGR correction amount kegr is restricted by the minimum value (minimum EGR correction amount) $kegr_{min}$. If $kegr_{min} \leq kegr$ at step S110, the process proceeds to step S112, where the ECU 30 determines whether or not the EGR correction amount kegr is equal to or less than the allowable maximum value $kegr_{max}$ ($kegr \leq kegr_{max}$). If "$kegr \leq kegr_{max}$" is not established, the process proceeds to step S113, where the EGR correction amount kegr is restricted by the maximum value (maximum EGR correction amount) $kegr_{max}$.

Thus, in this embodiment, where the combustion control is executed in the manner described above, the following effects (a) to (c) are obtained.

(a) The torque variation dln in the engine 1 is approximated to the target value dln|v| by increasing or decreasing both the fuel injection amount and the EGR amount. This enables prompt and reliable approximation of the torque variation dln to the target value dln|v|.

(b) The target value dln|v| can be located in an area of the EGR amount in which the torque variation dln does not change excessively with the change in the EGR amount by increasing or decreasing the fuel injection amount. This prevents the torque variation dln from greatly displacing on the increase side with respect to the target value dln|v|, and thus prevents a reduction of the drivability due to such a great displacement of the torque variation dln on the increase side with respect to the target value dln|v|.

(c) In "stratified burning", the change in the $NO_x$ emission amount with the change in the EGR amount is small. Accordingly, the $NO_x$ emission amount will not excessively increase with the shift from point P to point Q in FIG. 10. Emission is therefore prevented from being worsened.

(Second embodiment)

The second embodiment according to the present invention will be described with reference to the relevant drawings. This embodiment is different from the first embodiment only in the control methods for the fuel injection amount control and the EGR amount control. The construction of this embodiment is the same as that of the first embodiment shown in FIGS. 3 and 4.

Figure 11:
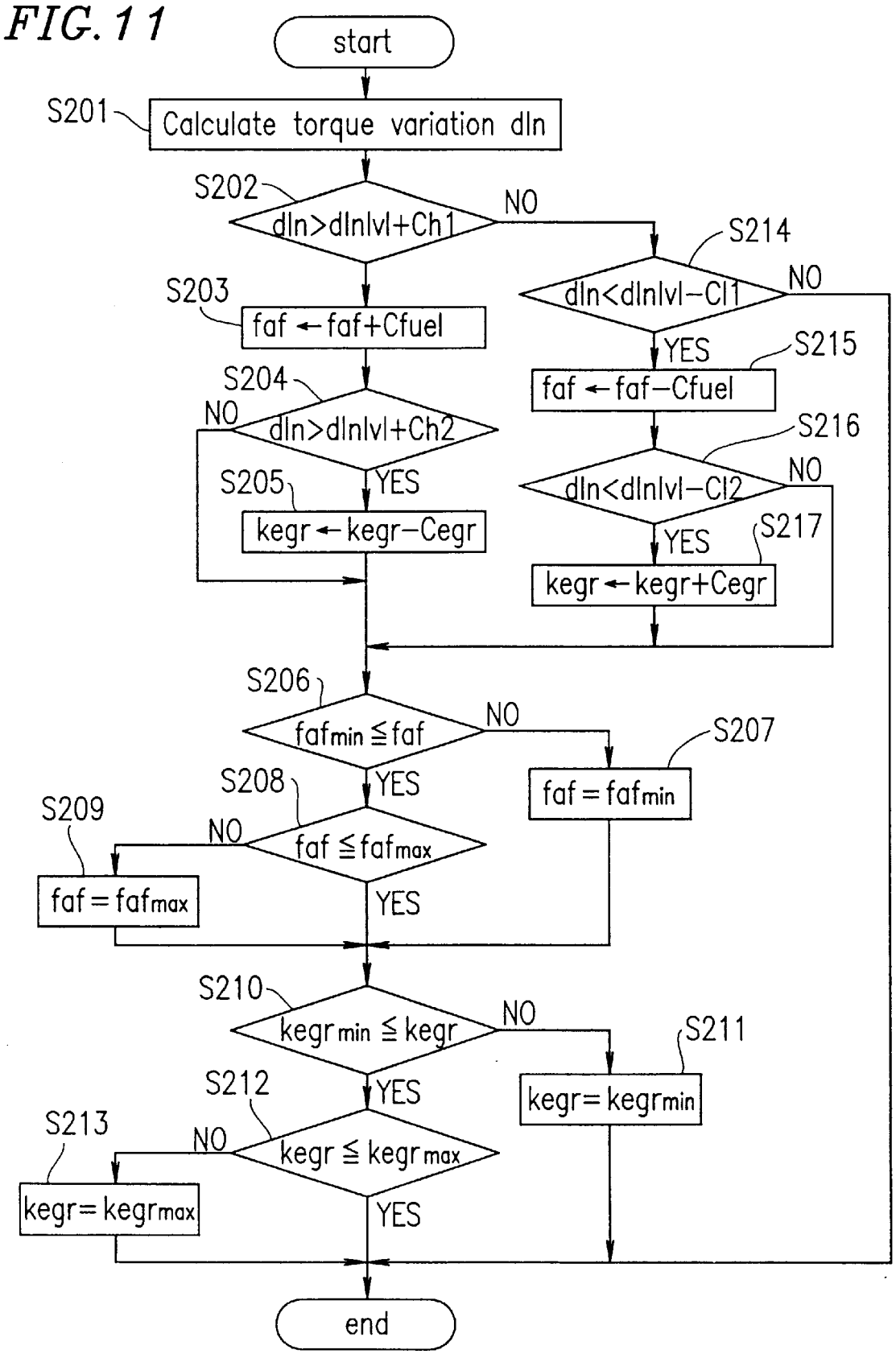
FIG. 11 is a flowchart showing a processing routine for controlling the fuel injection amount and the EGR amount in the second embodiment.

FIG. 11 shows a processing routine for executing the fuel injection amount control and the EGR amount control in this embodiment. This routine is executed at an occasion r of angle interruption for each predetermined crank angle.

Figure 12:
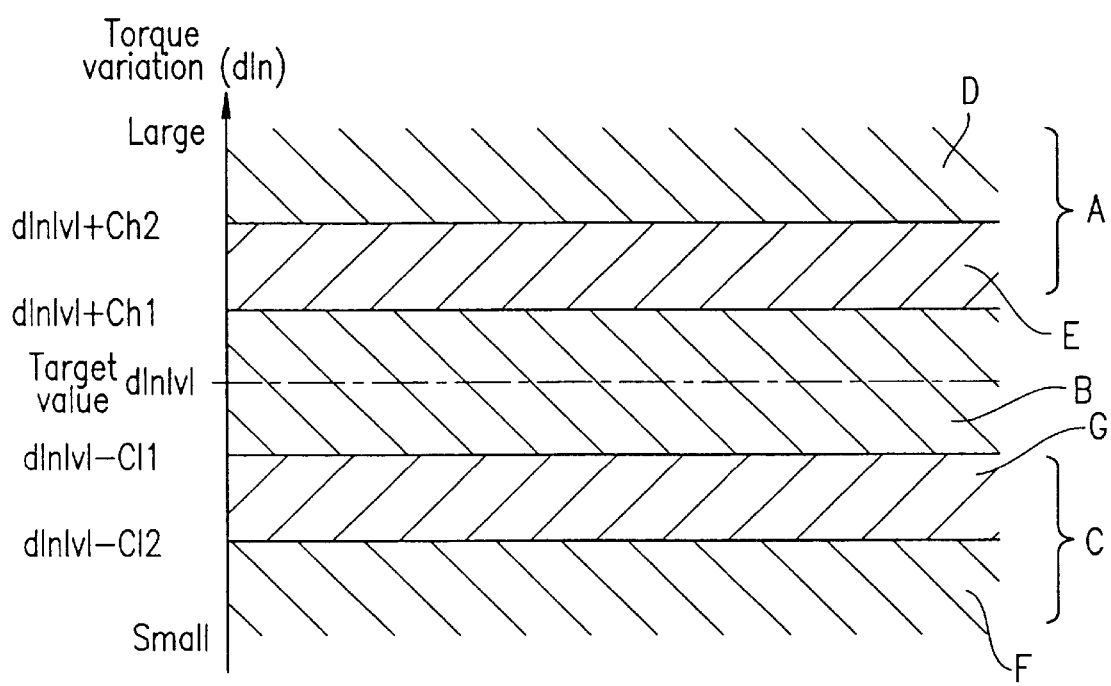
FIG. 12 is a graph showing ranges of the torque variation in the second embodiment.

In the illustrated processing routine, at step S201, the ECU 30 calculates the torque variation dln of the engine 1 as in step S101 in the first embodiment. Then, at step S202, the ECU 30 determines whether or not the calculated torque variation dln is larger than a value obtained by adding a predetermined value Ch1 to the target value dln|v| (dln|v|+Ch1). If dln>dln|v|+Ch1, i.e., the torque variation dln is in a range A shown in FIG. 12, the process proceeds to step S203.

At step S203, the ECU 30 corrects the fuel injection amount incrementally by adding the fuel correction amount faf. Then, at step S204, the ECU 30 determines whether or not the torque variation dln is larger than a value obtained by adding a predetermined value Ch2 to the target value dln|v|

($dln|v|+Ch2$). The predetermined value Ch2 is set at a value larger than the predetermined value Ch1. If $dln>dln|v|+Ch2$, i.e., the torque variation dln is in a range D shown in FIG. 12, the process proceeds to step S205. At step S205, the ECU 30 decreases an ECR correction amount kegr to decrease the ECR amount, and the process proceeds to step S206. If "$dln>dln|v|+Ch2$" is not established at step 204, i.e., the torque variation dln is in a range E shown in FIG. 12, the process directly proceeds to step S206.

Figure 13:
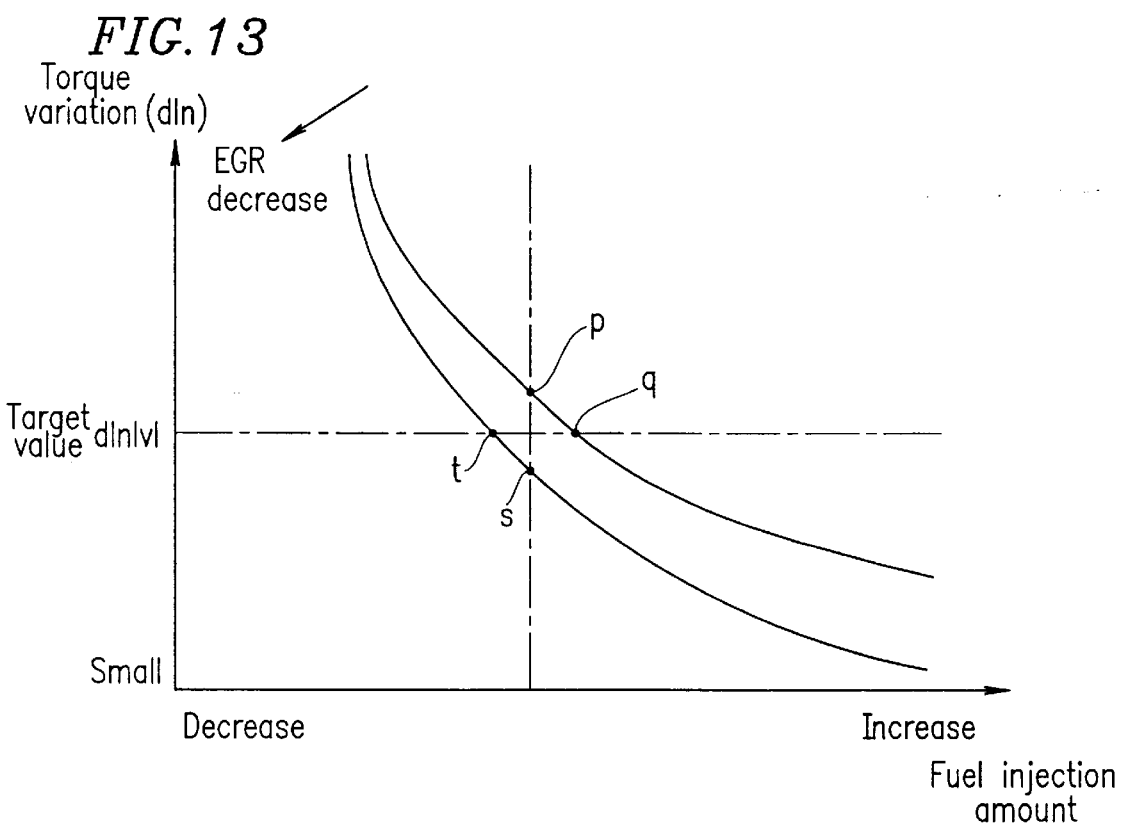
FIG. 13 is a graph showing the relationship among the torque variation, the fuel injection amount, and the EGR amount in the second embodiment.
Figure 14:
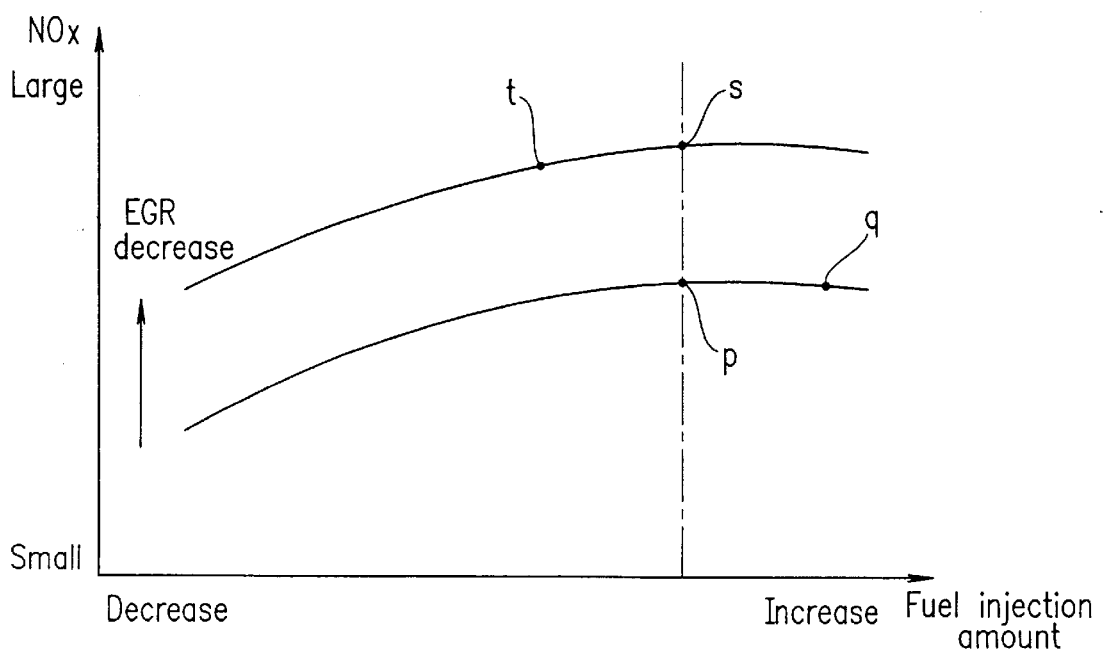
FIG. 14 is a graph showing the relationship among the $NO_x$ amoung, the fuel injection amount, and the EGR amount in the second embodiment.

In the above fuel injection amount control and the EGR amount control, where the predetermined value Ch2 is set larger than the predetermined value Ch1, when the torque variation dln exceeds the target value dln|v|, the fuel injection amount is first increased before the EGR amount is decreased. Accordingly, when the torque variation dln is slightly displaced from the target value dln|v| on the increase side as indicated by point p in FIG. 13, only the fuel injection amount is increased without decreasing the EGR amount, allowing point p to shift to point q and thus approximating the torque variation dln to the target value dln|v|. In this case, as shown in FIG. 14, since the EGR amount is not decreased, the $NO_x$ emission amount is not increased with the shift of point p to point q, preventing emission from worsening.

If "$dln>dln|v|+Ch1$" is not established at step S202, the process proceeds to step S214. At step S214, the ECU 30 determines whether or not the torque variation dln is smaller than a value obtained by subtracting a predetermined value C11 from the target value dln|v| (dln|v|-C11). If "$dln<dln|v|-C11$" is not established, i.e., the torque variation dln is in a range B shown in FIG. 12, the ECU 30 terminates this processing. If $dln<dln|v|-C11$, i.e., the torque variation dln is in a range C shown in FIG. 12, the process proceeds to step S215.

At step S215, the ECU 30 corrects the fuel injection amount decrementally by decreasing the fuel correction amount faf. Then, the process proceeds to step S216, where the ECU 30 determines whether or not the torque variation dln is smaller than a value obtained by subtracting a predetermined value C12 from the target value dln|v| (dln|v|-C12). The predetermined value C12 is set at a value larger than the predetermined value C11. If $dln<dln|v|-C12$, i.e., the torque variation dln is in a range F shown in FIG. 12, the process proceeds to step S217. At step S217, the ECU 30 increases the EGR amount by increasing the EGR correction amount kegr, and the process proceeds to step S206. If "$dln<dln|v|-C12$" is not established at step S216, i.e., the torque variation dln is in a range G shown in FIG. 12, the process directly proceeds to step S206.

In the above fuel injection amount control and the EGR amount control, where the predetermined value C12 is set larger than the predetermined value C11, when the torque variation dln becomes less than the target value dln|v|, the fuel injection amount is first decreased before the EGR amount is increased. Accordingly, when the torque variation dln is slightly displaced from the target value dln|v| on the decrease side as indicated by point s in FIG. 13, only the fuel injection amount is decreased without increasing the EGR amount, allowing point s to shift to point t and thus approximating the torque variation dln to the target value dln|v|. In this case, as shown in FIG. 14, since the fuel injection amount is decreased, not increasing the EGR amount, with the shift of point a to point t, fuel consumption can be reduced.

Steps S206 to S213 are the same as steps S106 to S113 in the first embodiment. The description of these steps is therefore omitted here.

Thus, in this embodiment, where the combustion control is executed in the manner described above, the following effects (d) to (f) are obtained, in addition to the effects described in the first embodiment.

(d) The predetermined value Ch2 is set larger than the predetermined value Ch1, so that when the torque variation dln exceeds the target value dln|v|, the fuel injection amount is first increased before the EGR amount is decreased. Under this control, when the torque variation dln is slightly displaced from the target value dln|v| on the increase side, only the fuel injection amount is increased without decreasing the EGR amount so as to approximate the torque variation dln to the target value dln|v|. Since the EGR amount is not decreased, the $NO_x$ emission amount is prevented from increasing, and thus emission is prevented from worsening.

(e) The predetermined value C12 is set larger than the predetermined value C11 so that when the torque variation dln becomes less than the target value dln|v|, the fuel injection amount is first decreased before the EGR amount is increased. Under this control, when the torque variation dln is slightly displaced from the target value dln|v| on the decrease side, only the fuel injection amount is decreased without increasing the EGR amount so as to approximate the torque variation dln to the target value dln|v|. Since the fuel injection amount is decreased without increasing the EGR amount, fuel consumption can be reduced.

(f) The EGR mechanism 51 generates a response delay in which the change in the EGR amount in response to a change in the opening of the EGR valve 53 is delayed. In this embodiment, when the torque variation dln is slightly displaced from the target value dln|v|, only the fuel injection amount is increased or decreased as described above. This prevents the EGR valve 53 from excessively responding to a slight displacement of the torque variation dln from the target value dln|v| on the increase or decrease side. Thus, in this embodiment, the EGR amount is prevented from becoming an inappropriate value due to the response delay of the change in the EGR amount in response to a change in the opening of the EGR valve 53.

(Third Embodiment)

The third embodiment according to the present invention will be described with the relevant drawings. This embodiment is different from the first and second embodiments only in the control methods for the fuel injection amount control and the EGR amount control. The construction of this embodiment is the same as that of the first embodiment shown in FIGS. 3 and 4.

Figure 16:
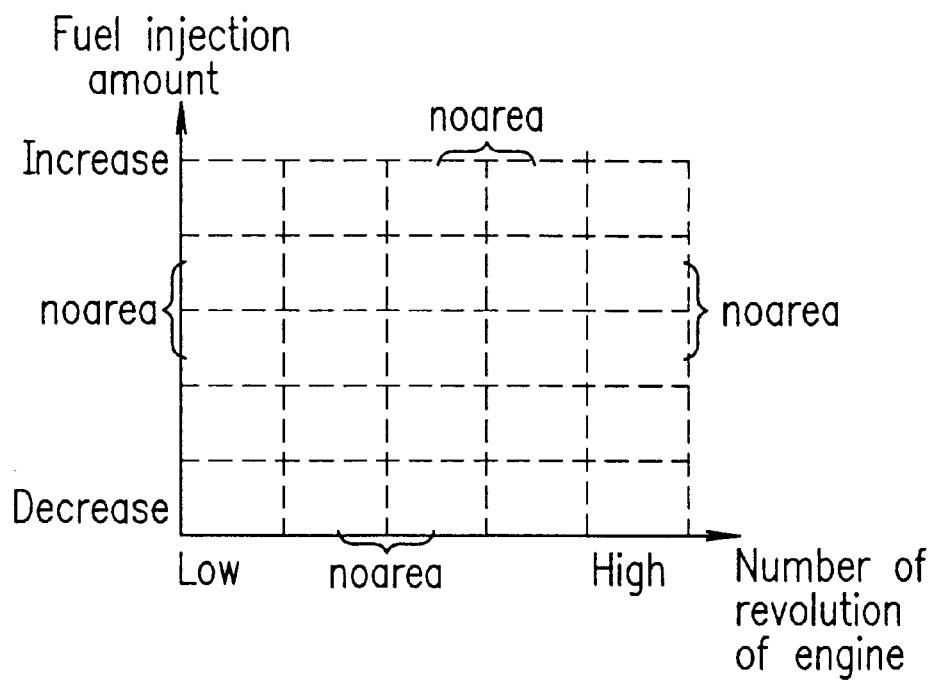
FIG. 16 is a learning map showing learning areas in the third embodiment.
Figure 17:
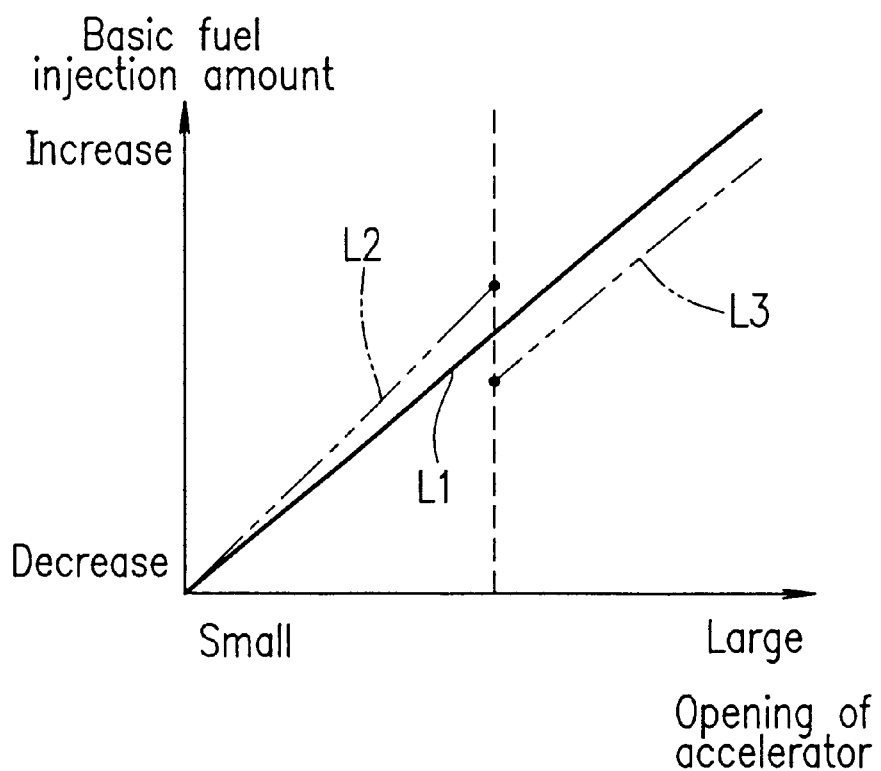
FIG. 17 is a basic fuel injection amount map for calculating the basic fuel injection amount in the third embodiment.

The ECU 30 of this embodiment stores a learning map shown in FIG. 16 and a basic fuel injection amount map shown in FIG. 17 in the RAM 32 and the ROM 33, respectively. The learning map has a plurality of learning areas noarea for the fuel correction amount faf and the EGR correction amount kegr, which are allocated based on the number of revolutions of the engine and the fuel injection amount. The basic fuel injection amount map has values of the basic fuel injection amount registered in correspondence with the opening of the accelerator. The actual fuel injection amount is determined by correcting the basic fuel injection amount using the fuel correction amount faf.

As described in the first example in detail, the fuel correction amount faf and the EGR correction amount kegr are changed so that the torque variation dln is approximated to the target value dln|v|. In this embodiment, the changed values of the fuel correction amount faf and the EGR correction amount kegr are learned in association with the corresponding driving range of the engine 1, i.e., in association with the corresponding number of revolutions of the engine and fuel injection amount. Accordingly, when the engine 1 is being driven in a driving state within a certain learning area noarea shown in FIG. 16 and the fuel correction amount faf is changed, the fuel injection amount may be increased as represented by the two-dot chain line L2 in FIG. 17, with respect to the basic fuel injection amount represented by the solid line L1. Further, when the driving state of the engine 1 is changed so that the learning area noarea is shifted to an adjacent learning area noarea while the number of revolutions of the engine is fixed, the fuel correction amount faf is additionally changed with the shift of the learning area noarea. This may result in that the fuel injection amount is decreased as represented by the two-dot chain line L3, for example, with respect to the basic fuel injection amount represented by the solid line L1.

Accordingly, when the driving state of the engine 1 is changed so as to shift to another learning area noarea, if the value of the fuel correction amount faf changed in the preceding learning area noarea is still valid in the new learning area noarea, the fuel injection amount which changes according to the opening of the accelerator shifts as represented by the two-dot chain lines L2 and L3. This indicates that as the opening of the accelerator increases, the fuel injection amount largely changes at the moment when the driving state shifts from one learning area noarea to another, resulting in generating a shock to the engine 1.

Figure 15:
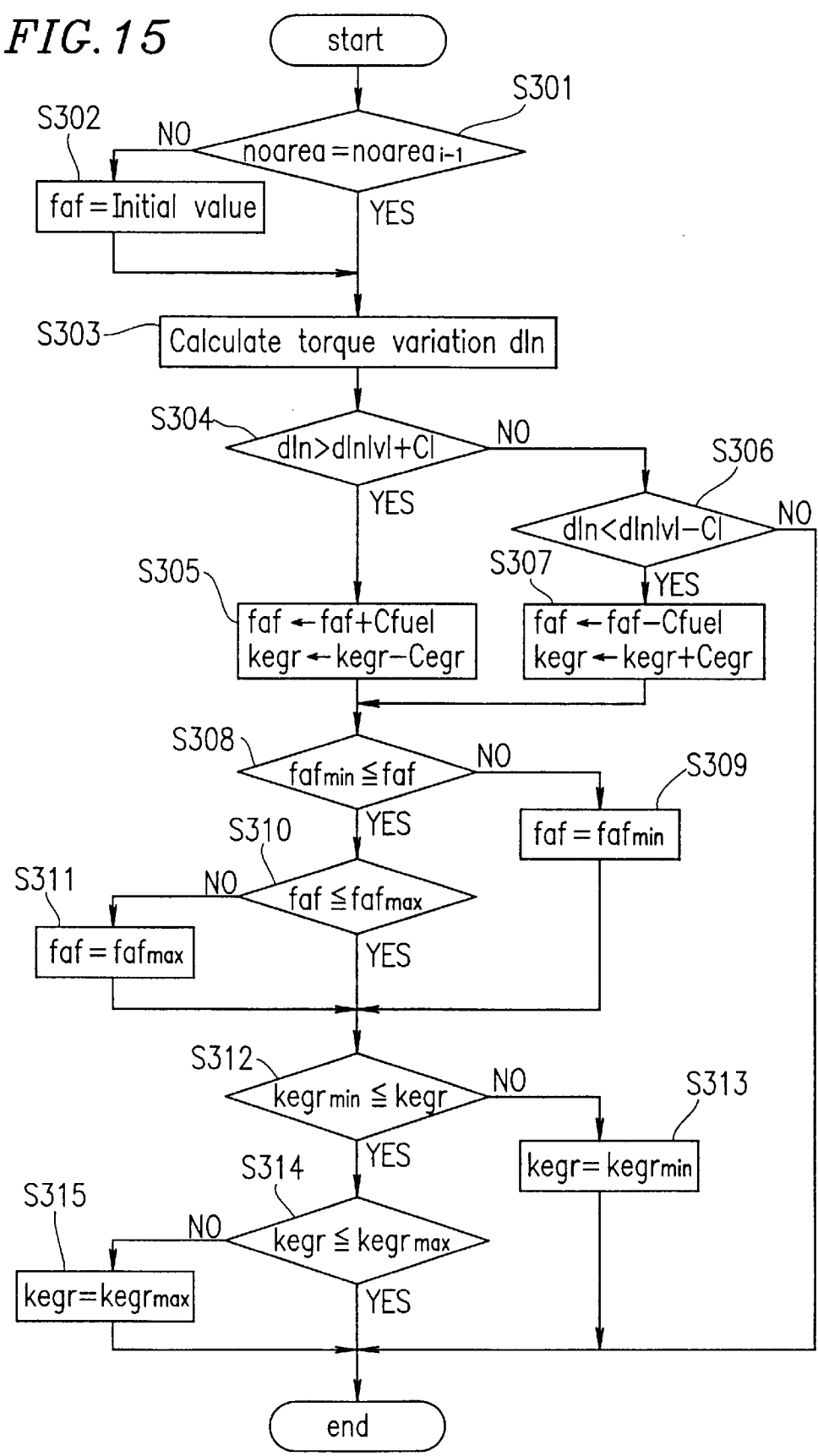
FIG. 15 is a flowchart showing a processing routine for controlling the fuel injection amount and the EGR amount in the third embodiment.

FIG. 15 shows a processing routine for preventing such a shock from being generated due to such a change in the fuel correction amount faf, where the learning area noarea is shifted, the fuel correction amount faf is initialized (e.g., it is set at "1" for multiplication correction and "0" for addition or subtraction correction).

More specifically, in the illustrated processing routine, at step S301, the ECU 30 determines whether or not the driving state has shifted from one learning area noarea to an adjacent learning area based on the fuel injection amount and the number of revolutions of the engine. If the driving state has shifted to an adjacent learning area noarea, the process proceeds to step S302, where the fuel correction amount faf is initialized. The process then proceeds to step S303. If it is determined that there is no shift to an adjacent learning area noarea, the process directly proceeds to step S303.

Steps S303 to S315 are the same as steps S101 to S113 in the first embodiment. The description of these steps is therefore omitted here.

Thus, in this embodiment, where the combustion control is executed in the manner described above, the following effect (g) is obtained, in addition to the effects described in the first embodiment.

(g) When the driving state is shifted from one learning area noarea to an adjacent learning area, the fuel correction amount faf is initialized. This suppresses the fuel injection amount from being changed so greatly that a shock may be generated.

The above embodiments may be modified as follows:

(1) In the above embodiments, the case where the engine 1 performs "stratified burning" was described. In a driving range of the engine 1 in which the load is higher than that required to perform "stratified burning", "homogeneous lean burning" may be performed. To accomplish this, the engine 1 switches the burning method in accordance with the load, so as to perform either "stratified burning" or "homogeneous lean burning". During the "homogeneous lean burning", also, the fuel injection amount is increased or decreased by changing the fuel correction amount faf, so that the torque variation dln is approximated to the target value dln|v|. In this case, the maximum value $faf_{max}$ of the fuel correction amount faf (maximum fuel correction amount) during the "stratified burning" is set at a value smaller than the maximum value $faf_{max}$ of the fuel correction amount faf (maximum fuel correction amount) during the "homogeneous lean burning". This prevents misfiring due to an excessive fuel injection amount during the "stratified burning" in which a mixed gas including fuel at a high concentration.

(2) In the above embodiment, the torque variation dln was detected as an output variation of the engine 1, and the fuel injection amount and the EGR amount were increased or decreased so as to approximate the torque variation dln to the target value dln|v|. The present invention is not limited to this construction. For example, the air fuel ratio which corresponds to the output variation of the engine 1 may be detected by an air fuel ratio sensor disposed in the engine 1. The fuel injection amount and the EGR amount can be increased or decreased so that the actual air fuel ratio of the engine 1 detected by the air fuel ratio sensor is approximated to an air fuel ratio serving like the above target value dln|v| (target air fuel ratio).

(3) In place of detecting the torque variation dln, a cylinder internal pressure sensor may be provided for detecting the pressure in the combustion chamber 5, so as to detect the time at which the cylinder internal pressure is maximum which changes in correspondence with the output variation of the engine 1. The fuel injection amount and the EGR amount can be increased or decreased so that the actual cylinder internal pressure maximum time is approximated to a cylinder internal pressure maximum time serving like the above target value dln|v| (target cylinder internal pressure maximum time).

(4) A combustion pressure which changes in correspondence with the output variation of the engine 1 may be detected by the cylinder internal pressure sensor. The fuel injection amount and the EGR amount can be increased or decreased so that the actual combustion pressure is approximated to a combustion pressure serving like the above target value dln|v| (target combustion pressure).

(5) In place of detecting the torque variation dln, the rotational speed of the crank shaft which changes in correspondence with the output variation of the engine 1 may be detected. The fuel injection amount and the EGR amount can be increased or decreased so that the detected rotational speed is approximated to a rotational speed of the crank shaft serving like the above target value dln|v| (target rotational speed).

(6) In the second embodiment, the fuel correction amount faf may be initialized when the driving state is shifted to another learning area noarea, as in the third embodiment. In this case, both effects provided by the second and third embodiment can be obtained.

(Fourth embodiment)

In the fourth embodiment, the combustion control device of the internal combustion engine according to the present invention is applied to a car engine performing "lean burning". This embodiment will be described in detail with reference to the relevant drawings. This embodiment is different from the first embodiment only in the control methods for the fuel injection amount control and the EGR amount control. The construction of this embodiment is the same as that of the first embodiment shown in FIGS. 3 and 4.

Figure 18:
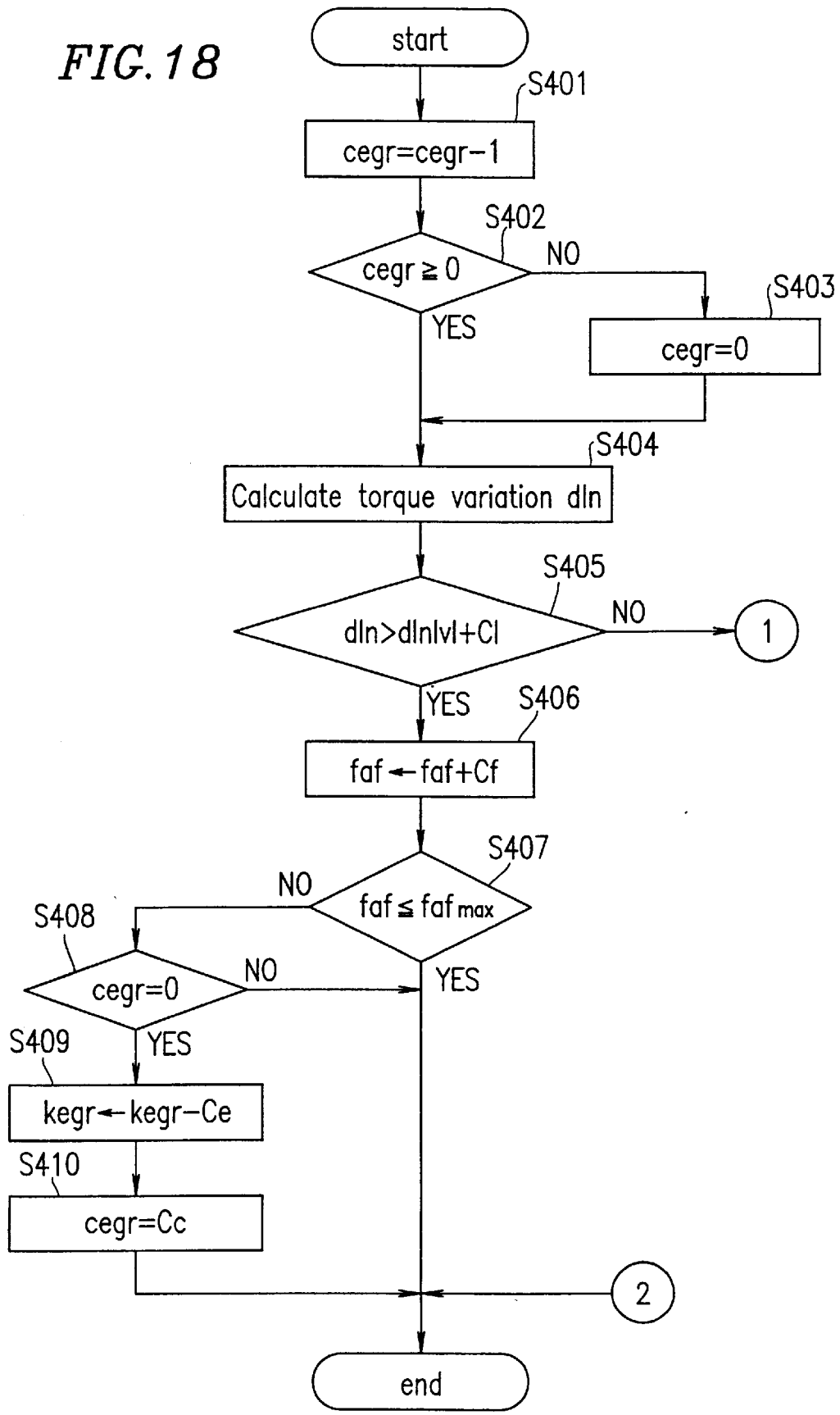
FIG. 18 is a flowchart showing a processing routine for controlling the fuel injection amount and the EGR amount in the fourth embodiment according to the present invention.
Figure 19:
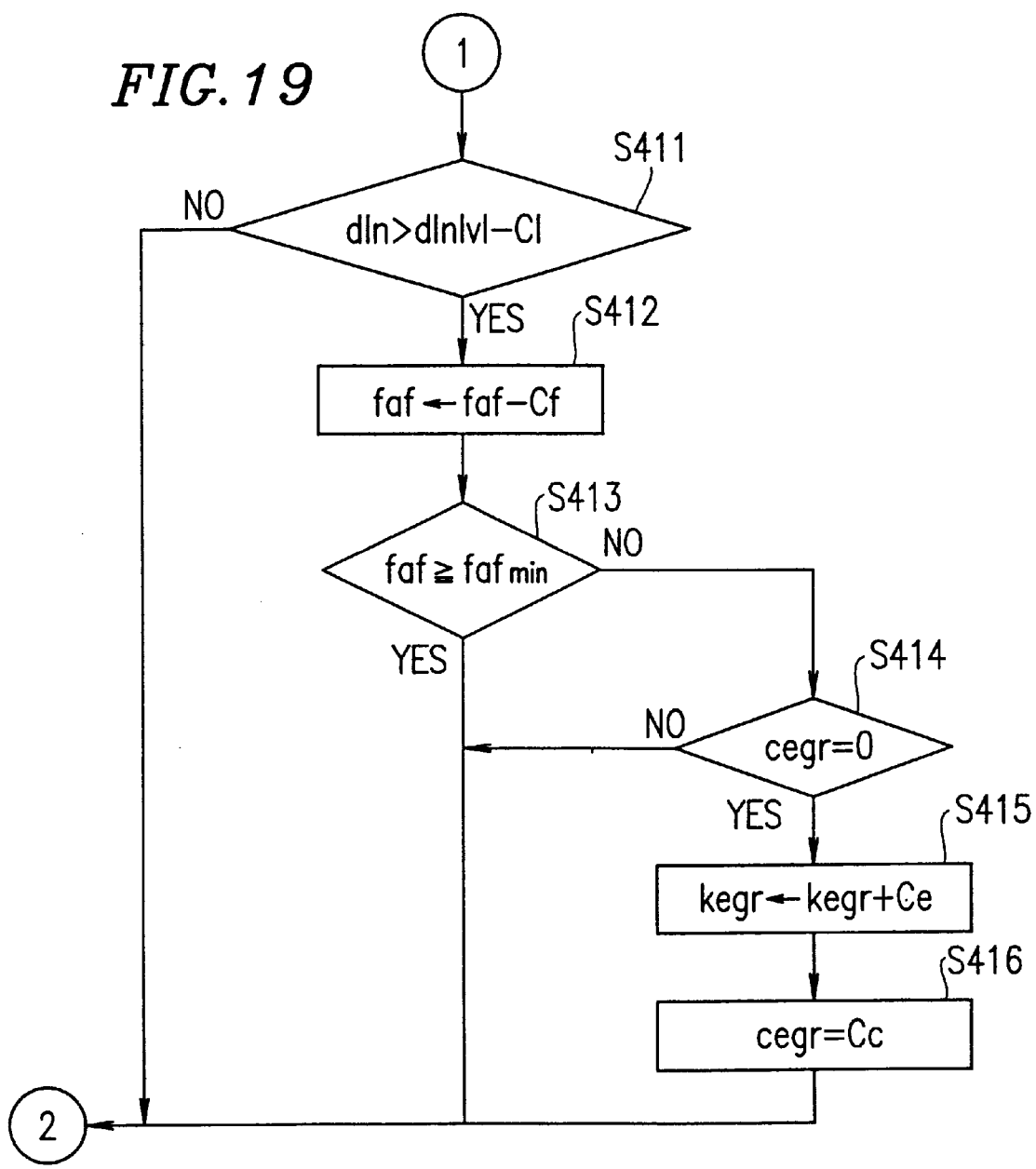
FIG. 19 is another flowchart showing a processing routine for controlling the fuel injection amount and the EGR amount in the fourth embodiment.

Referring to FIGS. 18 and 19, the fuel injection amount control and the EGR amount control by the combustion control device of this embodiment will be described. FIGS. 18 and 19 show a processing routine for the fuel injection amount control and the EGR amount control executed by the ECU 30 at an occasion of angle interruption for each predetermined crank angle.

In the illustrated processing routine, at step S401, the ECU 30 subtracts "1" from a post EGR amount change counter cegr. The post EGR amount change counter cegr is decreased by "1" whenever a certain time passes (a certain angle is passed) after the preceding change of the EGR amount. The initial value of the post EGR amount change counter cegr is a predetermined value Co, which will be described hereinafter. The predetermined value Cc is determined so that the EGR amount is not changed excessively.

At step S402, the ECU 30 determines whether or not the post EGR amount change counter cegr is equal to or greater than "0". If the post EGR amount change counter cegr is less than "0", the process proceeds to step S403. After the post EGR amount change counter cegr is set at "0" at step S403, the process proceeds to step S404. If the post EGR amount change counter cegr is equal to or greater than "0" at step S402, the process directly proceeds to step S404.

AT step S404, the ECU 30 calculates the torque variation dln of the entire engine 1 based on output pulses from the top dead center sensor 27 and the crank angle sensor 38. The torque variation dln is calculated in accordance with expressions (1) to (3) above.

At step S405, the ECU 30 determines whether or not the calculated torque variation dln is larger than a value obtained by adding the predetermined value C1 to the target value dln|v| (dln|v|+C1). If dln>dln|v|+C1, i.e., the torque variation dln is in the range A shown in FIG. 7, the process proceeds to step S406. If "dln>dln|v|+C1" is not established, the process proceeds to step S411 (FIG. 19).

Step S406 and the subsequent steps in FIG. 18 represent a portion of the processing routine for controlling the incremental correction of the fuel injection amount and the decremental correction of the EGR amount. Step S411 and the subsequent steps in FIG. 19 represent a portion of the processing routine for controlling the decremental correction of the fuel injection amount and the incremental condition of the EGR amount.

When the process proceeds to step S406 based on the determination at step S405, the ECU 30 sets a value obtained by adding a predetermined value cf to the fuel correction amount faf used in the preceding correction of the combustion injection amount (faf+Cf) as a new fuel correction amount faf. That is, the fuel injection amount is incrementally corrected at step S406. The process proceeds to step S407, where the ECU 30 determines whether or not the newly set fuel correction amount faf is equal to or less than the maximum fuel correction determination value $faf_{max}$.

When the process proceeds to step S411 based on the determination at step S405, the ECU 30 determines whether or not the torque variation dln is smaller than a value obtained by subtracting the predetermined value C1 from the target value dln|v| (dln|v|−C1). If "dln<dln|v|−C1" is not established, i.e., the torque variation dln is in the range B shown in FIG. 7, the ECU 30 terminates this processing routine. If dln<dln|v|−C1, i.e., the torque variation dln is in the range C, the process proceeds to step S412.

At step S412, the ECU 30 sets a value obtained by subtracting the predetermined value Cf from the fuel correction amount faf used in the preceding correction of the combustion injection amount (faf−Cf) as a new fuel correction amount faf. That is, the fuel injection amount is decrementally corrected at step S412. The process proceeds to step S413, where the ECU 30 determines whether or not the newly set fuel correction amount faf is equal to or greater than the minimum fuel correction determination value $faf_{min}$.

The maximum fuel correction determination value $faf_{max}$ and the minimum fuel correction determination value $faf_{min}$ are calculated in the following manner. That is, the fuel correction amount faf is set at such a value that the fuel injection amount is not changed when it is corrected with the value (e.g., "1" for multiplication correction and "0" for addition or subtraction correction), and the fuel injection amount from the fuel injection valve 11 in the case of using this value is measured. At this time, the resultant fuel injection amount from the fuel injection value 11 is larger or smaller than a theoretical amount which should otherwise be injected, due to a design size tolerance and the like. The fuel correction amount faf required to obtain by fuel injection amount correction the same fuel injection amount as that obtained when the fuel injection amount if increased most greatly from the theoretical value due to a size tolerance and the like, is set as the maximum fuel correction determination value $faf_{max}$. Likewise, the fuel correction amount faf required to obtain by fuel injection amount correction the same fuel injection amount as that obtained when the fuel injection amount is decreased most greatly from the theoretical value due to a size tolerance and the like, is set as the minimum fuel correction determination value $faf_{max}$.

By the above setting of the maximum fuel correction determination value $faf_{max}$ and the minimum fuel correction determination value $faf_{min}$, it is ensured that the fuel injection amount from the fuel injection valve 11 falls within a range of increase and decrease due to a size tolerance and the like if "faf≦$faf_{max}$" is determined at step S407 or "faf≧$faf_{min}$" is determined at step S413.

Thus, when the above determination is made, it is considered that the torque variation dln of the engine 1 may be in the range A or C (FIG. 7) which is away from the target value dln|v| presumably because of an increase or a decrease (variation) of the fuel injection amount generated due to the design size tolerance of the fuel injection valve and the like. In other words, the torque variation dln may be displaced from the target value dln|v| when the fuel injection amount is increased or decreased from a required amount. For this reason, if "faf≦$faf_{max}$" is determined at step S407 or "faf≧$faf_{min}$" is determined at step S413, the processing routine is terminated without changing the EGR amount.

At step S407, if it is determined that "faf≦$faf_{max}$" is not established, this means that the fuel injection amount from the fuel injection valve 11 is displaced on the increase side from the range of increase and decrease due to a size tolerance and the like. In this case, the process proceeds to step S408, where the ECU 30 determines whether or not the post EGR amount change counter cegr is "0", that is, whether or not a predetermined time has passed after the preceding EGR amount change, so as to avoid an excessive change of the EGR amount. If "cegr=0" is not established, the processing routine is terminated. If cegr=0, the process proceeds to step S409.

At step S409, the ECU 30 sets a value obtained by subtracting a predetermined value Ce from the EGR correction amount kegr used in the preceding EGR amount correction (kegr−Ce) as a new EGR correction amount kegr. In other words, the EGR amount is decrementally corrected at step S409. The process proceeds to step S410, where the ECU 30 sets the post EGR amount change counter cegr at the predetermined value Co. The predetermined value Co is set so that the EGR amount is not changed excessively as described above.

At step S413, if it is determined that "faf≧$faf_{min}$" is not established, this means that the fuel injection amount from the fuel injection valve 11 is displaced on the decrease side from the range of increase and decrease due to a size tolerance and the like. In this case, the process proceeds to step S414, where the ECU 30 determines whether or not the post EGR amount change counter cegr is "0", that is, whether or not a predetermined time has passed after the preceding EGR amount change, as in step S408 described above. If "degr=0" is not established, the processing routine is terminated. If cegr=0, the process proceeds to step S415.

At step S415, the ECU 30 sets a value obtained by adding the predetermined value Ce to the EGR correction amount kegr used in the preceding EGR amount correction (kegr+ Ca) as a new EGR correction amount kegr. In other words, the EGR amount is incrementally corrected at step S415. The process proceeds to step S416, where the ECU 30 sets the post EGR amount change counter cegr at the predetermined value Co, as in step S410 described above.

In this embodiment described above for controlling the correction of the fuel injection amount and the EGR amount, the following effect (a) is obtained.

(a) In the above processing routine, in increasing or decreasing the fuel injection amount so that the torque variation dln of the engine 1 is approximated to the target value dln|v|, when the fuel injection amount falls within the range of increase and decrease due to the size tolerance of the fuel injection valve 11 and the like, the EGR amount is not changed. Therefore, when the fuel injection amount decreases below a required amount due to a size tolerance and the like, increasing the output variation dln of the engine 1 ("dln>dln|v|+C1"), the EGR amount will not be decreased unlike the conventional case where it is decreased to approximate the output variation dln to the target value dln|v|. This ensures prevention of the problem of worsening emission in the engine 1 performing "lean burning", which otherwise occurs because the ECR amount is decreased when the fuel injection amount decreases below a required amount due to the tolerance and the like described above.

This embodiment may be modified as follows.

(1) In this embodiment, in the case where the fuel correction amount faf exceeds a fuel correction amount fafM1 which is larger than the maximum value $faf_{max}$, a new EGR correction amount may be set by subtracting a predetermined value CeB1, which is larger than the predetermined value Ce, from the EGR correction amount kegr obtained by EGR correction performed before the fuel correction amount faf becomes larger than the correction amount fafM1. In this case, as the fuel injection amount after the correction is farther displaced from the range of increase and decrease of the fuel injection amount due to the size tolerance of the fuel injection valve 11 and the like, the decrease of the EGR amount is larger. As a result, the output variation of the engine 1 can be reliably suppressed by decreasing the EGR amount even when the corrected fuel injection amount is widely displaced on the increase side from the range of increase and decrease of the fuel injection amount due to the size tolerance and the like described above.

(2) In the above paragraph (1), a plurality of (e.g., three) correction amounts fafM1 to fafM3 which are larger than the maximum value $faf_{max}$ may be sequentially set, and a plurality of (e.g., three) predetermined values CeB1 to CeB3 used for the setting of the EGR correction amount may be set to be sequentially larger in correspondence with the correction amounts fafM1 to fafM3. In this case, also, as the fuel injection amount after the correction is farther displaced from the range of increase and decrease of the fuel injection amount due to the size tolerance of the fuel injection valve 11 and the like, the decrease of the EGR amount is larger. Thus, substantially the same effect as that described in paragraph (1) above can be obtained.

(3) In this embodiment, in the case where the fuel correction amount faf becomes smaller than a correction amount fafm1 which is smaller than the minimum value $faf_{min}$, a new EGR correction value may be set by adding a predetermined value Ceb1, which is larger than the predetermined value Ce, to the EGR correction amount kegr obtained by EGR correction performed before the fuel correction amount faf becomes smaller than the correction amount afm1. As a result, the emission worsening can be reliably prevented by the increase of the EGR amount even when the corrected fuel injection amount is widely displaced on the increase side from the range of increase and decrease of the fuel injection amount due to a size tolerance and the like.

(4) In the above paragraph (3), a plurality of (e.g., three) correction amounts fafm1 to fafm3 which are smaller than the minimum value $faf_{min}$ may be sequentially set, and a plurality of (e.g., three) predetermined values Ceb1 to Ceb3 used for the setting of the EGR correction amount may be set to be sequentially larger in correspondence with the correction amounts fafm1 to fafm3. In this case, also, as the fuel injection amount after the correction is farther displaced from the range of increase and decrease of the fuel injection amount due to the size tolerance of the fuel injection valve 11 and the like, the increase of the EGR amount is made larger. Thus, substantially the same effect as that described in paragraph (3) above can be obtained.

(5) In this embodiment, the minimum fuel correction determination value fafmin and the maximum fuel correction determination value fafmax were set based on the size tolerance of the fuel system such as the fuel injection valve 11. The present invention is not limited to this setting. For example, the actual air fuel ratio may be measured using an air fuel ratio sensor, to obtain the minimum and maximum of a variation of the air fuel ratio. The fuel correction amounts faf required, by fuel injection amount correction, to obtain the same fuel injection amounts as those obtained when the minimum and maximum of the air fuel ratio are used, may be set as the minimum fuel correction determination value $faf_{min}$ and the maximum fuel correction determination value $faf_{max}$, respectively. The thus-obtained minimum fuel correction determination value $faf_{min}$ and maximum fuel correction determination value $faf_{max}$ are values which consider not only the size tolerance of the fuel system such as the fuel injection valve 11 but also the size tolerance of the intake system such as the throttle valve.

Figure 20:
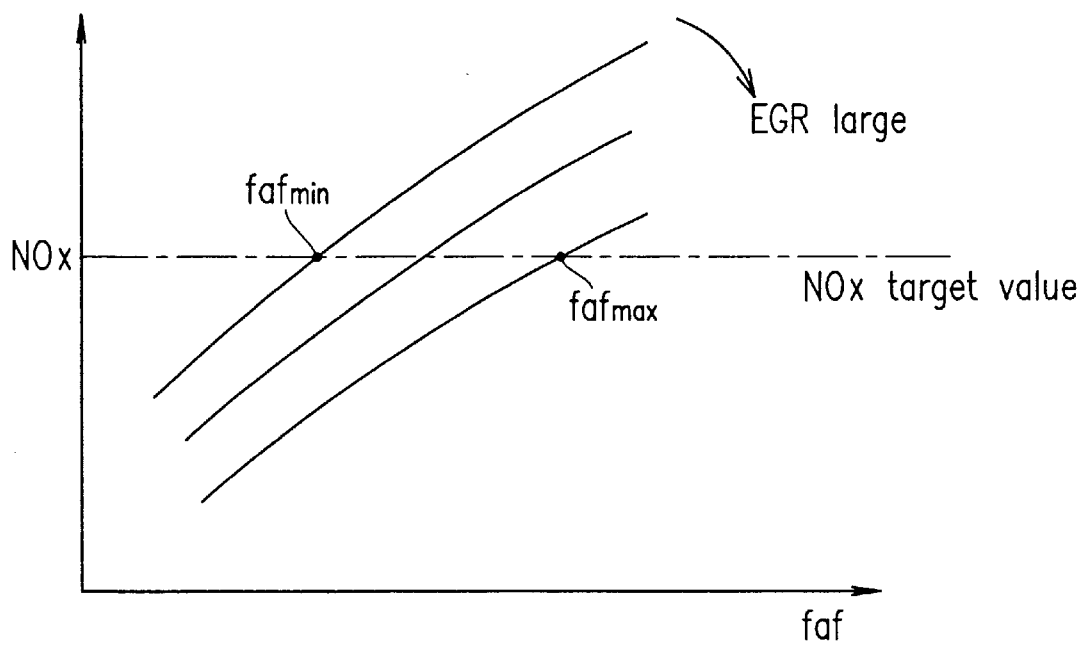
FIG. 20 is a graph showing the relationship among the fuel correction amount, the EGR amount, and the $NO_x$ emission amount in the fourth embodiment.
Figure 21:
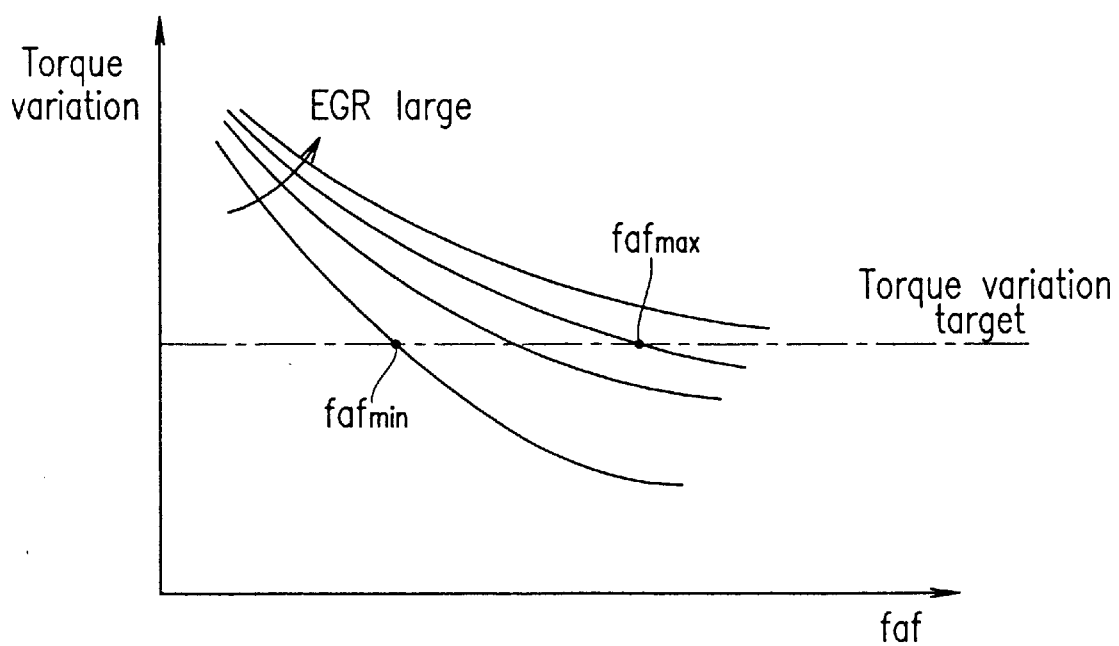
FIG. 21 is a graph showing the relationship among the fuel correction amount, the EGR amount, and the torque variation in the fourth embodiment.
Figure 22:
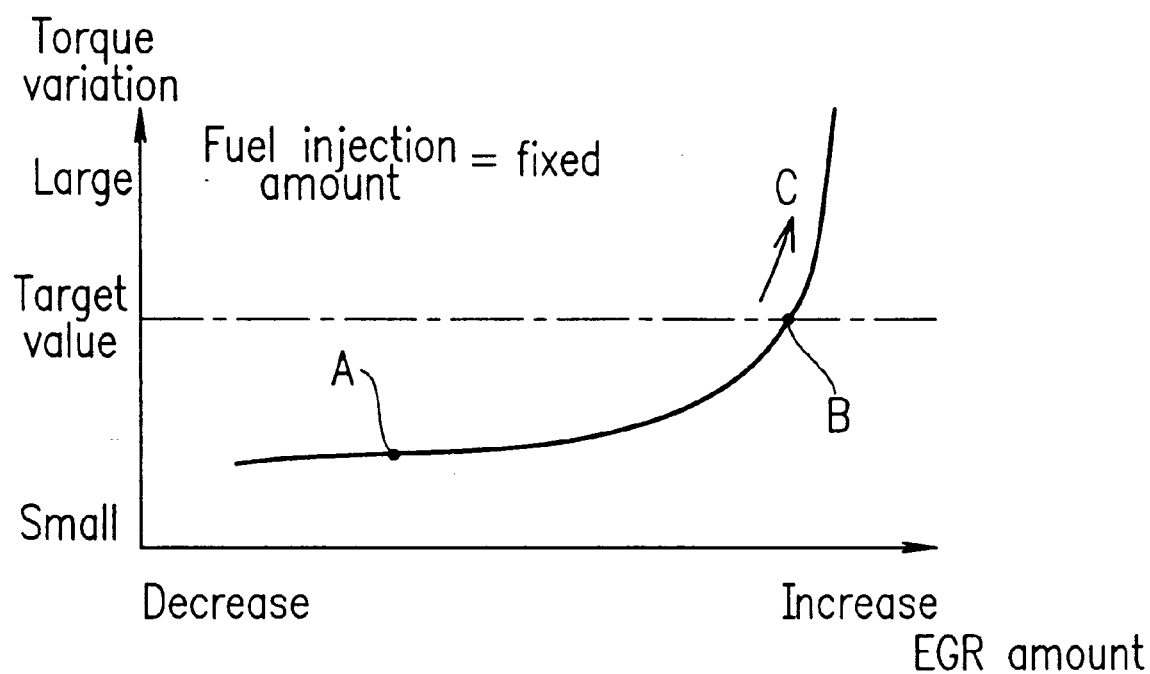
FIG. 22 is a graph showing the relationship among the torque variation, the fuel injection amount, and the EGR amount in a conventional engine.

(6) In general, the fuel correction amount faf, the EGR amount, and the $NO_x$ emission amount have the relationship shown in FIG. 20, and the fuel correction amount faf, the EGR amount, and the torque variation have the relationship shown in FIG. 21. Using these relationships, the minimum and maximum values of a level of the fuel correction amount faf that satisfies the torque variation and the $NO_x$ emission amount may be determined by experiment, so that the determined minimum and maximum values are set as the minimum fuel correction determination value $faf_{min}$ and the maximum fuel correction determination value $faf_{max}$.

(7) In this embodiment, for the output variation of the engine 1, the air fuel ratio which changes in correspondence with the output variation may be detected by an air fuel ratio sensor disposed in the engine 1. In this case, the fuel injection amount can be increased or decreased so that the actual air fuel ratio of the engine 1 detected by the air fuel ratio sensor is approximated to an air fuel serving like the target value dln|v| (target air fuel ratio).

(8) In place of detecting the torque variation dln, a cylinder internal pressure sensor may be provided for detecting the pressure in the combustion chamber 5, so as to detect the time at which the cylinder internal pressure is maximum, which changes in correspondence with the output variation of the engine 1. The fuel injection amount can be increased or decreased so that the actual cylinder internal pressure maximum time is approximated to a cylinder internal pressure maximum time serving like the above target value dln|v| (target cylinder internal pressure maximum time).

(9) In place of detecting the torque variation dln, the rotational speed of the crank shaft which changes in correspondence with the output variation of the engine 1 may be detected. The fuel injection amount can be increased or decreased so that the detected rotational speed is approximated to a rotational speed of the crank shaft serving like the above target dln|v| (target rotational speed).

INDUSTRIAL APPLICABILITY

Thus, according to the present invention, in the case where the output variation of the internal combustion engine is displaced from a target value, both the fuel injection amount and the exhaust gas recirculation amount are increased or decreased to approximate the output variation to the target value. This enables quick approximation of the output variation to the target value.

In one embodiment, in the case where the output variation of the internal combustion engine becomes smaller than the target value, the output variation is made large by decreasing the fuel injection amount and increasing the exhaust gas recirculation amount. In the case where the output variation of the internal combustion engine becomes larger than the target value, the output variation is made small by increasing the fuel injection amount and decreasing the exhaust gas recirculation amount. As a result, when the output variation becomes smaller or larger than the target value, it can be reliably approximated to the target value by an increase or decrease of the fuel injection amount and the exhaust gas recirculation amount.

In one embodiment, in the case where the torque variation of the internal combustion engine slightly changes incrementally from the target value or slightly changes decrementally from the target value, only the fuel injection amount is increased or decreased, before increasing or decreasing the exhaust gas recirculation amount, so as to approximate the torque variation to the target value. In this case, since the exhaust gas recirculation amount is not decreased, emission is prevented from worsening. Also, since the fuel injection amount can be decreased without increasing the exhaust gas recirculation amount, the fuel consumption of the internal combustion engine is reduced.

In one embodiment, the maximum fuel correction amount during stratified burning is made smaller than that during homogeneous burning. This prevents misfiring during the stratified burning in which a mixed gas including fuel at a higher concentration exists in the vicinity of the ignition plug.

According to the present invention, the exhaust gas recirculation amount is increased or decreased so as to approximate the output variation of the internal combustion engine to a target value, based on the fuel injection amount which has been increased or decreased so as to approximate the output variation of the internal combustion engine to the target value. This suppresses emission from worsening due to insufficient amount of exhaust gas to be recirculated. Thus, even during the lean burning of an internal combustion engine which performs exhaust gas recirculation amount control, emission worsening can be controlled.

In one embodiment, the fuel injection amount is decreased when the output variation of the internal combustion engine is smaller than the target value, and the fuel injection amount is increased when the output variation of the internal combustion engine is larger than the target value, so that the output variation is approximated to the target value.

The fuel injection amount increases or decreases from a required amount due to the size tolerances of the intake system and the fuel system of the internal combustion engine, for example. In one embodiment, when the fuel injection amount is displaced on the increase side from a range of increase and decrease in which the fuel injection amount is increased or decreased due to a size tolerance and the like, the exhaust gas amount to be recirculated to the intake system of the internal combustion engine is decreased so as to approximate the output variation to a target value. This means that when the fuel injection amount is decreased from a required amount due to the tolerances, increasing the output variation of the internal combustion engine, the exhaust gas recirculation amount is not decreased to approximate the output variation to the target value. Moreover, the decrease of the exhaust gas recirculation amount is made larger as the fuel injection amount is farther displaced from the above range of increase and decrease on the increase side. Accordingly, even when the fuel injection amount is widely displaced from the range of increase and decrease of the fuel injection amount due to the size tolerances and the like, the output variation of the internal combustion engine can be reliably suppressed.

Accordingly, in an internal combustion engine performing lean burning, when the fuel injection amount becomes smaller than a required amount due to the size tolerances of the intake system and the fuel system of the engine and the like, the exhaust gas to be recirculated will not be decreased, and thus emission is reliably prevented from worsening.

In one embodiment, when the fuel injection amount is displaced on the decrease side from the range of increase and decrease of the fuel injection amount due to a size tolerance and the like, the increase amount of the exhaust gas to be recirculated is made larger as the fuel injection amount is farther displaced from the range of increase and decrease. Accordingly, in an internal combustion engine performing lean burning, even when the fuel injection amount is widely displaced on the increase side from the range of increase and decrease of the fuel injection amount due to a size tolerance and the like, emission is reliably prevented from worsening.

What is claimed is:

1. A combustion control device for an internal combustion engine, comprising:

fuel injection means for injecting fuel into a cylinder of the internal combustion engine;

exhaust gas recirculation means for recirculating part of exhaust gas exhausted from an exhaust system of the internal combustion engine to an intake system of the internal combustion engine;

output variation detection means for detecting output variation of the internal combustion engine; and control means for correcting a fuel injection amount injected by the fuel injection means incrementally immediately when the output variation detected by the output variation detection means exceeds a target value so as to approximate the output variation to the target value, and correcting an exhaust gas amount to be recirculated by the exhaust gas recirculation means decrementally when the output variation detected by the output variation detection means is greater than the target value so as to approximate the output variation to the target value.

2. A combustion control device for an internal combustion engine according to claim 1, wherein control means corrects the fuel injection amount decrementally immediately when the output variation detected by the output variation detection means becomes below a target value so as to approximate the output variation to the target value, and corrects the exhaust gas amount to be recirculated incrementally when the output variation detected by the output variation detection means is smaller than the target value so as to approximate the output variation to the target value.

3. A combustion control device for an internal combustion engine according to claim 1, wherein the control means corrects the exhaust gas amount to be recirculated decrementally when the output variation detected by the output variation detection means exceeds a predetermined value which is greater than the target value.

4. A combustion control device for an internal combustion engine according to claim 2, wherein the control means corrects the exhaust gas amount to be recirculated incrementally when the output variation detected by the output variation detection means becomes below a predetermined value which is smaller than the target value.

5. A combustion control device for an internal combustion engine according to claim 1, wherein the internal combustion engine performs homogeneous burning and stratified burning selectively, and a maximum fuel correction amount used when the fuel injection amount is corrected incrementally to approximate the output variation of the internal combustion engine to a target value during the stratified burning is set at a value smaller than a maximum fuel correction amount used when the fuel injection amount is corrected incrementally to approximate the output variation to a target value during the homogeneous burning.

6. A combustion control device for an internal combustion engine, comprising:

fuel injection means for injecting fuel into a cylinder of the internal combustion engine;

exhaust gas recirculation means for recirculating part of exhaust gas exhausted from an exhaust system of the internal combustion engine to an intake system of the internal combustion engine;

output variation detection means for detecting output variation of the internal combustion engine;

injection amount control means for correcting a fuel injection amount injected by the fuel injection means based on the output variation detected by the output variation detection means so as to approximate the output variation to a target value; and recirculation amount control means for correcting an exhaust gas amount to be recirculated by the exhaust gas recirculation means so as to approximate the output variation of the internal combustion engine to the target value when the fuel injection amount corrected by the injection amount control means is displaced from a predetermined range of increase and decrease.

7. A combustion control device for an internal combustion engine according to claim 6, wherein the injection amount control means corrects the fuel injection amount incrementally when the output variation of the internal combustion engine is greater than the target value, and the recirculation amount control means decreases the exhaust gas amount to be recirculated when the fuel injection amount controlled by the injection amount control means is displaced from the range of increase and decrease on an increase side.

8. A combustion control device for an internal combustion engine according to claim 7, wherein the recirculation amount control means makes larger a decrease of the exhaust gas amount to be recirculated as the fuel injection amount controlled by the injection amount control means is displaced farther from the range of increase and decrease on the increase side.

9. A combustion control device for an internal combustion engine according to claim 6, wherein the injection amount control means corrects the fuel injection amount decrementally when the output variation of the internal combustion engine is smaller than the target value, and the recirculation amount control means increases the exhaust gas amount to be recirculated when the fuel injection amount controlled by the injection amount control means is displaced from the range of increase and decrease on a decrease side.

10. A combustion control device for an internal combustion engine according to claim 9, wherein the recirculation amount control means makes larger an increase of the exhaust gas amount to be recirculated as the fuel injection amount controlled by the injection amount control means is displayed farther from the range of increase and decrease on the decrease side.

* * * * *